United States Patent
Tai et al.

(10) Patent No.: US 6,822,031 B2
(45) Date of Patent: Nov. 23, 2004

(54) RESIN COMPOSITION AND A MULTILAYERED CONTAINER

(75) Inventors: Shinji Tai, Kurashiki (JP); Hiroyuki Shimo, Kurashiki (JP); Masakazu Nakaya, Kurashiki (JP); Kaoru Ikeda, Kurashiki (JP)

(73) Assignee: Kuraray Co., Ltd., Kurashiki (JP)

(*) Notice: Subject to any disclaimer, the term of this patent is extended or adjusted under 35 U.S.C. 154(b) by 182 days.

(21) Appl. No.: 10/111,912

(22) PCT Filed: Aug. 31, 2001

(86) PCT No.: PCT/JP01/07581

§ 371 (c)(1),
(2), (4) Date: May 1, 2002

(87) PCT Pub. No.: WO02/18496

PCT Pub. Date: May 2, 2001

(65) Prior Publication Data

US 2003/0018114 A1 Jan. 23, 2003

(30) Foreign Application Priority Data

Sep. 1, 2000 (JP) .......................... 2000-266184
Sep. 1, 2000 (JP) .......................... 2000-266185

(51) Int. Cl.$^7$ .............................. C08K 5/04; C08F 4/06
(52) U.S. Cl. ....................... 524/398; 526/90; 526/335; 428/35.2; 428/35.8
(58) Field of Search ........................... 524/398; 526/90, 526/335; 428/35.2, 35.8

(56) References Cited

U.S. PATENT DOCUMENTS 5,346,644 A * 9/1994 Speer et al. ........... 252/188.28

FOREIGN PATENT DOCUMENTS

| EP | 1 033 080 | 9/2000 |
|----|-----------|--------|
| EP | 1 067 154 A2 | 1/2001 |
| JP | 4-45144 | 2/1992 |
| JP | 4-211444 | 8/1992 |
| JP | 519616 | 12/1992 |
| JP | 5-156095 | 6/1993 |
| JP | 5-170980 | 7/1993 |
| JP | 5-295171 | 11/1993 |
| JP | 2001-72873 | 3/2001 |
| JP | 2001-106866 | 4/2001 |
| JP | 2001-106920 | 4/2001 |

* cited by examiner

Primary Examiner—Kriellion A. Sanders
(74) Attorney, Agent, or Firm—Oblon, Spivak, McClelland, Maier & Neustadt, P.C.

(57) ABSTRACT

The present invention provides a resin composition having an oxygen scavenging function. The resin composition comprises a gas barrier resin (A), a thermoplastic resin (B) other than the gas barrier resin (A), and a compatibilizer (C), wherein the gas barrier resin (A) has an oxygen transmission rate of 500 ml·20 $\mu$m/m$^2$·days·atm (20° C., 65% RH) or less, the thermoplastic resin (B) has a carbon—carbon double bond, and an oxygen absorption rate of the resin composition is 0.001 m/m$^2$·day or more.

39 Claims, 6 Drawing Sheets

RESIN COMPOSITION AND A MULTILAYERED CONTAINER

TECHNICAL FIELD

The present invention relates to a resin composition having an oxygen scavenging function. The present invention also relates to a resin composition having good gas barrier properties, moisture-resistance, aroma retentivity, and flavor barrier properties, in addition to the oxygen scavenging function, and a multilayered container made of such a resin composition.

BACKGROUND ART

Gas barrier resins such as ethylene-vinyl alcohol copolymer (hereinafter also abbreviated as EVOH) can be melt-molded, and have excellent gas barrier properties against oxygen or carbon dioxide gas. For this reason, a multilayered structure including a layer made of EVOH, for example, and a layer made of a thermoplastic resin having excellent moisture-resistance, mechanical properties or the like (e.g., thermoplastic polyester; hereinafter thermoplastic polyester may be abbreviated as PES) is utilized for various molded products (e.g., films, sheets, bottles, containers, etc.) that require gas barrier properties. For example, such multilayered structures are used in various fields as a multilayered container, in particular, in the form of bags, bottles, cups, pouches, etc. For example, they are widely used in such fields as foods, cosmetics, medicines, toiletries and the like.

Such a multilayered container has good barrier properties against oxygen, carbon dioxide gas, and the like. However, its permeability of gases such as oxygen is not exactly zero, unlike metals used for cans, etc. and glass used for bottles, etc. but still permits transmission of gas in an amount that cannot be neglected. In particular, for containers of foods, the degradation of food contents due to oxidation when the food is preserved for a long time is of great concern. Therefore, improvement of the oxygen barrier properties is strongly desired.

Furthermore, when filling the contents into a container, oxygen may be mixed in the container together with the contents. When the contents are susceptible to oxidization, even a trace amount of oxygen may degrade the quality of the contents. In order to prevent this, providing a material of the container with an oxygen scavenging function has been proposed. In this case, oxygen that might enter the container from the outside can be scavenged, so that the gas barrier properties of a packaging material also can be improved.

For example, as the method of providing the oxygen scavenging function to the gas barrier resin that constitutes a packaging material, the following methods are known: (1) An oxidation catalyst such as a transition metal is added to the EVOH to make the EVOH susceptible to oxidation, thereby providing the EVOH with the oxygen scavenging function (Japanese Laid-Open Patent Publication (Tokkai) No.4-211444); (2) A metal catalyst is added to polyvinyl chloride to make polyvinyl chloride susceptible to oxidation, thereby providing the polyvinyl chloride with the oxygen scavenging function (Japanese Laid-Open Patent Publication (Tokkai) No.4-45144); (3) A resin composition mainly comprising polyolefin and an oxidation catalyst, that is, polyolefin in a state susceptible to oxidation, is dispersed in the EVOH, thereby providing the EVOH with the oxygen scavenging function (Japanese Laid-Open Patent Publication (Tokkai) No.5-156095); and (4) EVOH, polyolefin, and an oxidation catalyst are blended to make the EVOH and polyolefin susceptible to oxidation, thereby providing the oxygen scavenging function (Japanese Laid-Open Patent Publication (Tokkai) No.5-170980). However, methods (1) and (2) fail to provide sufficiently improved oxygen barrier properties. Methods (3) and (4) have the disadvantage that the transparency of the gas barrier resin is impaired significantly.

Furthermore, in multilayered containers, especially when no adhesive resin layer is provided between the layers and the container filled with a drink or food is subjected to an impact caused by, for example, being dropped, delamination between the thermoplastic resin layer (e.g., PES layer) and the EVOH layer is likely to occur, which causes a large problem in the appearance.

DISCLOSURE OF INVENTION

It is an object of the present invention to provide a composition having an oxygen scavenging function. It is another object of the present invention to provide a resin composition having good gas barrier properties, transparency, moisture-resistance, aroma retentivity, and flavor barrier properties, in addition to the oxygen scavenging function. It is still another object of the present invention to provide a multilayered container including a layer made of the resin composition having a good impact delamination resistance and good appearance, in particular, satisfactory transparency.

A first resin composition of the present invention comprises a gas barrier resin (A), a thermoplastic resin (B) other than the gas barrier resin (A) and a compatibilizer (C), wherein the gas barrier resin (A) has an oxygen transmission rate of 500 ml·20 $\mu$m/m$^2$·days·atm (20° C., 65% RH) or less, the thermoplastic resin (B) has a carbon—carbon double bond, and an oxygen absorption rate of the resin composition is 0.001 ml/m$^2$·day or more.

In a preferred embodiment, the first resin composition further comprises a transition metal salt (D).

A second resin composition of the present invention comprises a gas barrier resin (A), a thermoplastic resin (B) other than the gas barrier resin (A), a compatibilizer (C) and a transition metal salt (D), wherein the gas barrier resin (A) has an oxygen transmission rate of 500 ml·20 $\mu$m/m$^2$·day·atm (20° C., 65% RH) or less, and the thermoplastic resin (B) has a carbon—carbon double bond.

In a preferred embodiment, the amount of the transition metal salt (D) contained in the first or second resin composition (when the first resin composition comprises the transition metal salt (D)) is 1 to 5000 ppm in terms of the metal element, based on a total weight of the gas barrier resin (A), the thermoplastic resin (B), and the compatibilizer (C).

In a preferred embodiment, the transition metal salt (D) comprises at least one transition metal selected from the group consisting of iron, nickel, copper, manganese, and cobalt.

In a preferred embodiment, the thermoplastic resin (B) comprises a carbon—carbon double bond in a ratio of 0.0001 eq/g or more.

In a preferred embodiment, the thermoplastic resin (B) comprises a unit represented by formula (I)

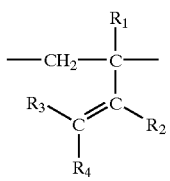

(I)

wherein $R_1$ is a hydrogen atom or an alkyl group having 1 to 5 carbon atoms, $R_2$ is a hydrogen atom, an alkyl group having 1 to 10 carbon atoms, an aryl group, an alkylaryl group, an arylalkyl group or an alkoxy group, $R_3$ and $R_4$ are each independently a hydrogen atom, an alkyl group having 1 to 10 carbon atoms, an aryl group that can be substituted, —COOR$_5$, —OCOR$_6$, a cyano group or a halogen atom, and $R_5$ and $R_6$ are each independently an alkyl group having 1 to 10 carbon atoms, an aryl group, an alkylaryl group, an arylalkyl group or an alkoxy group.

In a preferred embodiment, a number average molecular weight of the thermoplastic resin (B) is 1000 to 500000.

In a preferred embodiment, the gas barrier resin (A) is an ethylene-vinyl alcohol copolymer having an ethylene content of 5 to 60 mol % and a degree of saponification of 90% or more.

In a preferred embodiment, a difference in refractive index between the gas barrier resin (A) and the thermoplastic resin (B) is 0.01 or less.

In a preferred embodiment, in the above-mentioned resin compositions, particles of the thermoplastic resin (B) are dispersed in a matrix of the gas barrier resin (A).

In a preferred embodiment, each of the first and second resin compositions comprises 40 to 99.8 wt % of the gas barrier resin (A), 0.1 to 30 wt % of the thermoplastic resin (B), and 0.1 to 30 wt % of the compatibilizer (C).

A third resin composition of the present invention comprises a thermoplastic resin (B) and a compatibilizer (C), wherein the thermoplastic resin (B) comprises a unit represented by formula (I)

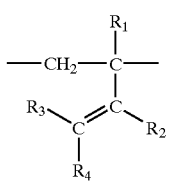

(I)

(wherein $R_1$ is a hydrogen atom or an alkyl group having 1 to 5 carbon atoms, $R_2$ is a hydrogen atom, an alkyl group having 1 to 10 carbon atoms, an aryl group, an alkylaryl group, an arylalkyl group or an alkoxy group, $R_3$ and $R_4$ are each independently a hydrogen atom, an alkyl group having 1 to 10 carbon atoms, an aryl group that can be substituted, —COOR$_5$, —OCOR$_6$, a cyano group or a halogen atom, and $R_5$ and $R_6$ are each independently an alkyl group having 1 to 10 carbon atoms, an aryl group, an alkylaryl group, an arylalkyl group or an alkoxy group); the thermoplastic resin (B) has a carbon—carbon double bond in a ratio of 0.0001 eq/g or more; a number average molecular weight of the thermoplastic resin (B) is 1000 to 500000; and an oxygen absorption rate of the resin composition is 0.1 ml/m$^2$·day or more.

In a preferred embodiment, the third resin composition further comprises a transition metal salt (D).

A fourth resin composition of the present invention comprises a thermoplastic resin (B), a compatibilizer (C), and a transition metal salt (D), wherein the thermoplastic resin (B) comprises a unit represented by formula

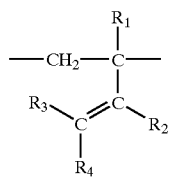

(I)

(wherein $R_1$ is a hydrogen atom or an alkyl group having 1 to 5 carbon atoms, $R_2$ is a hydrogen atom, an alkyl group having 1 to 10 carbon atoms, an aryl group, an alkylaryl group, an arylalkyl group or an alkoxy group, $R_3$ and $R_4$ are each independently a hydrogen atom, an alkyl group having 1 to 10 carbon atoms, an aryl group that can be substituted, —COOR$_5$, —OCOR$_6$, a cyano group or a halogen atom, and $R_5$ and $R_6$ are each independently an alkyl group having 1 to 10 carbon atoms, an aryl group, an alkylaryl group, an arylalkyl group or an alkoxy group); the thermoplastic resin (B) has a carbon—carbon double bond in a ratio of 0.0001 eq/g or more, and a number average molecular weight of the thermoplastic resin (B) is 1000 to 500000.

In a preferred embodiment, the amount of transition metal salt (D) contained in the third or fourth resin composition (when the third resin composition comprises the transition metal salt (D)) is 1 to 50000 ppm in terms of the metal element, based on a total weight of the thermoplastic resin (B) and the compatibilizer (C).

In a preferred embodiment, the transition metal salt (D) contained in the third or fourth resin composition (when the third resin composition comprises the transition metal salt (D)) comprises at least one transition metal selected from the group consisting of iron, nickel, copper, manganese, and cobalt.

In a preferred embodiment, the compatibilizer (C) is a thermoplastic resin having at least one functional group selected from the group consisting of a carboxyl group, a boronic acid group and a boron-containing group that can be converted to a boronic acid group in a presence of water.

In a preferred embodiment, the thermoplastic resin (B) comprises an aromatic vinyl compound unit and a diene compound unit.

In a preferred embodiment, the diene compound unit is at least one of an isoprene unit and a butadiene unit.

In a preferred embodiment, the aromatic vinyl compound unit is a styrene unit.

In a preferred embodiment, the thermoplastic resin (B) is a block copolymer.

A multilayered structure of the present invention comprises at least one layer made of any one of the first to fourth resin compositions.

A multilayered container of the present invention comprises at least one layer made of any one of the first to fourth resin compositions and at least one thermoplastic polyester layer.

A cap of the present invention comprises a gasket made of any one of the first to fourth resin compositions, wherein the gasket is mounted on a cap body.

BEST MODE FOR CARRYING OUT THE INVENTION

Figure 1:
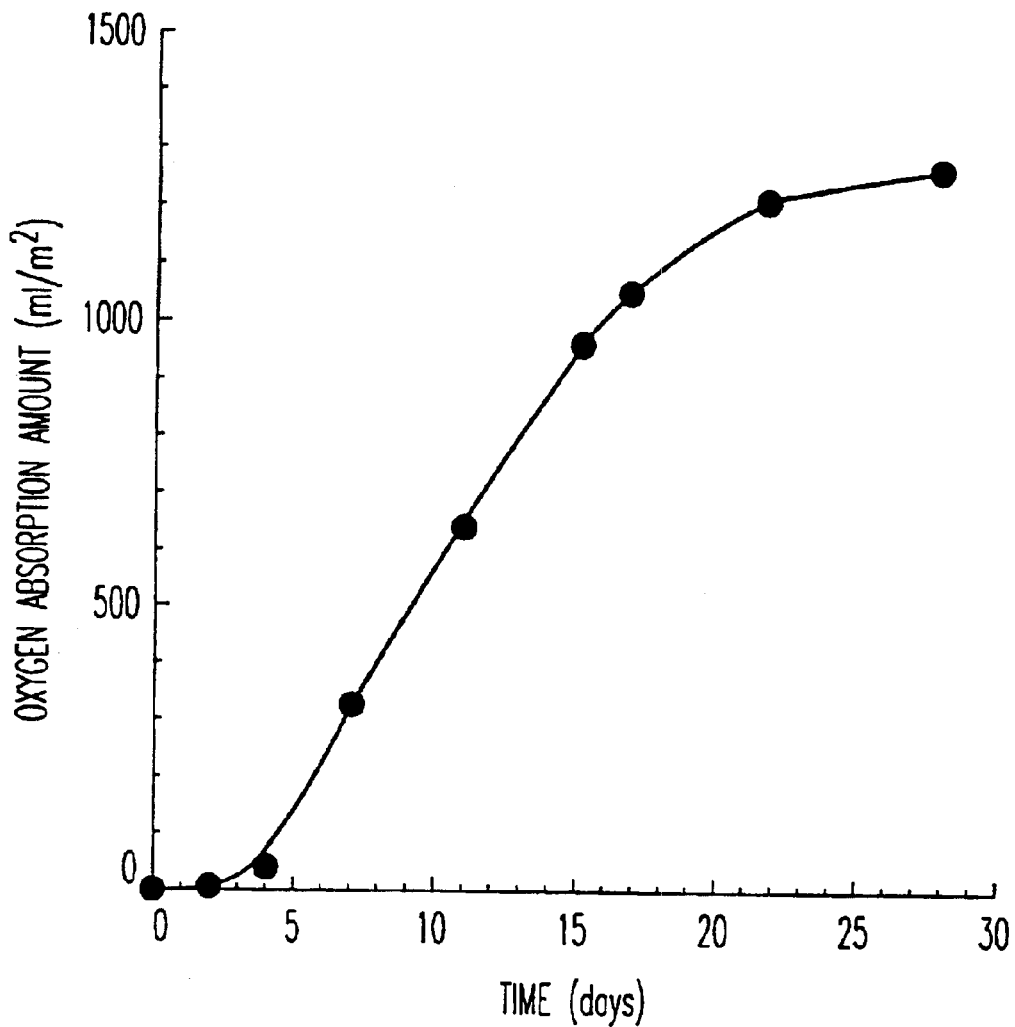
FIG. 1 is a graph in which the oxygen absorption amount of a first single layer film obtained in Example 1 is plotted with respect to time.

Hereinafter, the present invention will be described in detail.

In this specification, "scavenging oxygen" means absorbing and consuming oxygen or reducing the amount of oxygen from a given environment.

(Gas barrier resin (A))

There is no particular limitation regarding the type of the gas barrier resin (A) contained in the first resin composition and the second resin composition of the present invention, and any resin can be used, as long as it has good gas barrier properties. More specifically, resins having an oxygen transmission rate of 500 ml·20 $\mu$m/m$^2$·day·atm (20° C., 65% RH) or less can be used. This means that the volume of oxygen that is to be transmitted through a film having an area of 1 m$^2$ and a thickness of 20 $\mu$m per day under a differential pressure of oxygen of 1 atm is 500 ml or less when measurement is performed at a temperature of 20° C. and a relative humidity of 65%. If the oxygen transmission rate exceeds 500 ml·20 $\mu$m/m$^2$·days atm, the gas barrier properties of the resultant resin composition is insufficient. The oxygen transmission rate of the gas barrier resin (A) is preferably 100 ml·20 $\mu$m/m$^2$·days·atm or less, more preferably 20 ml·20 $\mu$m/m$^2$·days·atm or less, and even more preferably 5 ml·20 $\mu$m/m$^2$·day·atm or less.

The refractive index of the gas barrier resin (A) is preferably in the range from 1.50 to 1.56. If the refractive index is outside this range, the difference in the refractive index between the gas barrier resin (A) and the thermoplastic resin (B) increases, so that the transparency of the resultant resin composition may be degraded as described later. In general, the refractive index of the thermoplastic resin (B) having oxygen absorption properties is often within the above-described range, which makes it easy to reduce the difference in the refractive index between the thermoplastic resin (B) and the gas barrier resin (A), and therefore a resin composition that has a good transparency can be obtained. The refractive index of the gas barrier resin (A) is more preferably 1.51 or more, even more preferably 1.52 or more, and is also preferably 1.55 or less and more preferably 1.54 or less.

Typical examples of the above-described gas barrier resin (A) include a polyvinyl alcohol resin, a polyamide resin, a polyvinyl chloride resin and a polyacrylonitrile resin, but are not limited thereto.

Among the above-listed gas barrier resins (A), the polyvinyl alcohol resin can be obtained by saponifying a homopolymer of a vinylester or a copolymer of a vinylester and other monomers (especially a copolymer of a vinylester and ethylene) with an alkali catalyst or the like. A typical compound can be the vinylester can be vinyl acetate, but other fatty acid vinylesters (e.g., vinyl propionate, vinyl pivalate, etc.) also can be used.

The degree of saponification of the vinyl ester component of the polyvinyl alcohol resin is preferably 90% or more, more preferably 95% or more, and even more preferably 96% or more. When the degree of saponification is less than 90%, the gas barrier properties are degraded under high humidity, and if the polyvinyl alcohol resin is EVOH, the thermal stability is insufficient so that gel or aggregates can be produced and are likely to be contained in a molded article.

When the polyvinyl alcohol resin is a blend of at least two kinds of polyvinyl alcohol resins having different degrees of saponification, the average calculated based on the blend weight ratio is determined as the degree of saponification of the blend.

Among the polyvinyl alcohol resins as described above, EVOH is preferable because melt-molding is possible and its gas barrier properties under high humidity are good.

The ethylene content of EVOH is preferably 5 to 60 mol %. If the ethylene content is less than 5 mol %, the gas barrier properties under high humidity may be degraded and the melt moldability may deteriorate. The ethylene content of EVOH is preferably 10 mol % or more, more preferably 15 mol % or more, and most preferably 20 mol % or more. If the ethylene content exceeds 60 mol %, sufficiently good gas barrier properties may not be obtained. The ethylene content is preferably 55 mol % or less, and more preferably 50 mol % or less.

The EVOH to be used preferably has an ethylene content of 5 to 60 mol % and a degree of saponification of 90% or more, as described above. When the multilayered container comprising the resin composition of the present invention is desired to have an excellent impact delamination resistance, it is preferable to use the EVOH having an ethylene content of 25 mol % or more and 55 mol % or less and a degree of saponification of 90% or more and less than 99%.

When the EVOH is a blend of at least two kinds of EVOH having different ethylene contents, the average calculated based on the blend weight ratio is determined as the ethylene content of the blend. In this case, it is preferable that the difference in the ethylene contents between the two kinds of EVOH having the largest difference from each other is 30 mol % or less and that the difference in the degree of saponification is 10% or less. If these conditions are not satisfied, the transparency of the resultant resin composition layer may be inadequate. The difference in the ethylene content is preferably 20 mol % or less, and more preferably 15 mol % or less. The difference in the degree of saponification is preferably 7% or less, and more preferably 5% or less. When the multilayered container comprising the resin composition of the present invention is desired to have higher and balanced impact delamination resistance and gas barrier properties, it is preferable to blend an EVOH (a1) having an ethylene content of 25 mol % or more and 55 mol % or less and a degree of saponification of 90% or more and less than 99% and an EVOH (a2) having the ethylene content of 25 mol % or more and 55 mol % or less and a degree of saponification of 99% or more at a blend weight ratio a1/a2 of 5/95 to 95/5 for use.

The ethylene content and the degree of saponification of EVOH can be measured by nuclear magnetic resonance (NMR).

The EVOH can contain a small amount of a monomer other than ethylene and vinyl alcohol as a copolymer component (the monomer is contained in EVOH as a copolymer unit) within a range not interfering with the objects of the present invention. Examples of such a monomer include: α-olefins such as propylene, 1-butene, isobutene, 4-methyl-1-pentene, 1-hexene, and 1-octene; unsaturated carboxylic acids such as itaconic acid, methacrylic acid, acrylic acid, and maleic anhydride, and their salts, their partial or complete esters, their nitriles, their amides, and their anhydrides; vinylsilane compounds such as vinyltrimethoxysilane, vinyltriethoxysilane, vinyltri(β-methoxy-ethoxy)silane, γ-methacryloxypropyltrimethoxysilane; unsaturated sulfonic acids and their salts; alkylthiols; and vinylpyrrolidones.

Among the above, if a vinylsilane compound is contained in EVOH as a copolymer component in an amount of 0.0002 to 0.2 mol % and the composition of the present invention containing the EVOH is formed into a multilayered structure together with a resin (e.g., PES) as a base resin by coextrusion molding or coinjection molding, the consistency in the melt viscosity of the EVOH with the base resin is improved, so that a uniformly molded article can be produced. As the vinylsilane compound, vinyltrimethoxysilane and vinyltriethoxysilane can be used preferably.

Furthermore, EVOH containing a boron compound is also effective in improving the melt viscosity of the EVOH, so that articles uniformly molded by coextrusion or coinjection molding can be obtained. Examples of the boron compound include boric acids, boric acid esters, borates, and boron hydrides. Specifically, examples of the boric acids include orthoboric acid (hereinafter may be referred to as "boric acid"), metaboric acid, and tetraboric acid. Examples of the boric acid esters include triethyl borate and trimethyl borate. Examples of the borates include alkali metal salts, alkaline-earth metal salts of the boric acids, borax, and the like. Among these compounds, orthoboric acid is preferable.

The content of the boron compound, if contained, is preferably in the range of 20 to 2000 ppm, and more preferably 50 to 1000 ppm, in terms of the boron element. With the addition of boron within this range, torque variation in EVOH during melting by heating is suppressed. If the boron content is less than 20 ppm, this effect of adding the boron compound may be insufficient. If it exceeds 2000 ppm, gelation tends to occur, resulting in poor moldability.

It is also effective to add an alkali metal salt to the EVOH in an amount of 5 to 5000 ppm in terms of the alkali metal element in order to improve interlayer adhesions and compatibility. The added amount of the alkali metal salt is preferably in the range of 20 to 1000 ppm, and more preferably 30 to 500 ppm, in terms of the alkali metal element. Examples of the alkali metal include lithium, sodium, potassium, and the like. Examples of the alkali metal salt include aliphatic carboxylates, aromatic carboxylates, phosphates, and metal complexes of alkali metals. Specifically, they include sodium acetate, potassium acetate, sodium phosphate, lithium phosphate, sodium stearate, potassium stearate, a sodium salt of ethylenediaminetetraacetic acid, and the like. Among these, sodium acetate, potassium acetate, and sodium phosphate are preferable.

It is also preferable to add a phosphorus compound to the EVOH in an amount of 20 to 500 ppm, more preferably 30 to 300 ppm, and most preferably 50 to 200 ppm, in terms of the phosphoric acid radicals. When a phosphorus compound is blended with the EVOH in the above range, the thermal stability of the EVOH can be improved. In particular, generation of gelled aggregates and coloring during long-duration melt molding can be suppressed.

There is no particular limitation regarding the kind of phosphorus compound added to the EVOH, and various kinds of acids such as phosphoric acid and phosphorous acid and salts thereof may be used. Phosphates may be in the form of primary phosphates, secondary phosphates, or tertiary phosphates, and there is no particular limitation regarding the cationic species of the phosphates. The phosphates are preferably alkali metal salts and alkaline-earth metal salts. Among these, it is preferable to add the phosphorus compound in the form of sodium dihydrogenphosphate, potassium dihydrogenphosphate, disodium hydrogenphosphate, or dipotassium hydrogenphosphate.

The melt flow rate (MFR) of the EVOH used in the present invention (210° C., 2160 g load; according to JIS K7210) is in the range of 0.1 to 100 g/10 min, more preferably 0.5 to 50 g/10 min, and even more preferably 1 to 30 g/10 min.

There is no particular limitation regarding the polyamide resin as the gas barrier resins (A). Examples of the polyamide resin include: homopolymers of aliphatic polyamide such as polycaproamide (Nylon-6), polyundecanamide (Nylon-11), polylaurolactam (Nylon-12), polyhexamethylene adipamide (Nylon 6,6), and polyhexamethylene sebacamide (Nylon-6,12); copolymers of aliphatic polyamide such as caprolactam/laurolactam copolymer (Nylon-6/12), caprolactam/aminoundecanoic acid copolymer (Nylon-6/11), caprolactam/ω-aminononanoic acid copolymer (Nylon-6/9), caprolactam/hexamethylene adipamide copolymer (Nylon-6/6,6), caprolactam/hexamethylene adipamide/hexamethylene sebacamide copolymer (Nylon-6/6,6/6,12); aromatic polyamides such as polymetaxylylene adipamide (MX-Nylon), hexamethylene terephthalamide/hexamethylene isophthalamide copolymer (Nylon-6T/6I). These polyamide resins can be used alone or in combinations of two or more. Among these, polycaproamide (Nylon-6) and polyhexamethylene adipamide (Nylon-6,6) are preferable in view of gas barrier properties.

Examples of the polyvinyl chloride resin include a homopolymer such as vinyl chloride homopolymer and vinylidene chloride homopolymer and a copolymer containing vinyl chloride or vinylidene choloride and further containing vinyl acetate, a maleic acid derivative, a higher alkyl vinyl ether or the like.

Examples of the polyacrylonitrile resin include a homopolymer of acrylonitrile and copolymers of acrylonitrile and acrylic ester or the like.

As the gas barrier resin (A), one of the above-described resins can be used, or two or more can be used in combination. Among those, the polyvinyl alcohol resin is preferable and the EVOH having an ethylene content of 5 to 60 mol % and a degree of saponification of 90% or more is more preferable. When the gas barrier resin (A) is such an EVOH and the compatibilizer (C) that will be described later has a carboxyl group, the thermal stability of the obtained resin composition can be improved significantly.

In the present invention, it is also possible to blend to the gas barrier resin (A) a thermal stabilizer, an ultraviolet absorber, an antioxidant, a coloring agent, a filler, and other resins (e.g., polyamides and polyolefins) in advance, within a range not interfering with the objects of the present invention.

(Thermoplastic Resin (B))

The thermoplastic resin (B) contained in the resin composition of the present invention contains a carbon—carbon double bond. Since the carbon—carbon double bond reacts with oxygen efficiently, such a thermoplastic resin (B) has an oxygen scavenging function. In the present invention, the carbon—carbon double bond encompasses conjugated double bonds, but does not encompass multiple bonds contained in aromatic rings.

For the first and the second resin compositions of the present invention, there is no limitation regarding the kind of the thermoplastic resin (B), as long as it has the above-described characteristics and is a resin other than the gas barrier resin (A). For the third and the fourth resin compositions of the present invention, there is no limitation regarding the kind of the thermoplastic resin (B), as long as it has the above-described characteristics.

For the third and the fourth resin compositions of the present invention, the thermoplastic resin (B) should contain the carbon—carbon double bond in an amount of 0.0001 eq/g (equivalents/g) or more, preferably 0.0005 eq/g or more, and more preferably 0.001 eq/g or more. If the content of the carbon—carbon double bond is less than 0.0001 eq/g, the oxygen scavenging function of the resultant resin composition may not be sufficient. Also for the first and the second resin compositions of the present invention, it is preferable that the content of the carbon—carbon double bond is the above values or more.

The carbon—carbon-double bonds may be contained either in the main chain or the side chain of the thermoplastic resin (B), but it is preferable that the amount of the double bonds present in the side chains is larger than the amount of the double bonds present in the main chain (in other words, a larger number of groups having carbon—carbon double bonds exist in the side chains), because of the efficiency of reaction with oxygen. A double bond contained in a structural unit represented by formula (I) is preferable for the carbon—carbon double bond present in the side chains:

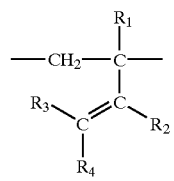

(I)

(wherein $R_1$ is a hydrogen atom or an alkyl group having 1 to 5 carbon atoms, $R_2$ is a hydrogen atom, an alkyl group having 1 to 10 carbon atoms, an aryl group, an alkylaryl group, an arylalkyl group or an alkoxy group, $R_3$ and $R_4$ are each independently a hydrogen atom, an alkyl group having 1 to 10 carbon atoms, an aryl group that may be substituted, —$COOR_5$, —$OCOR_6$, a cyano group or a halogen atom, $R_5$ and $R_6$ are each independently an alkyl group having 1 to 10 carbon atoms, an aryl group, an alkylaryl group, an arylalkyl group or an alkoxy group). The number of carbon atoms of the aryl group is preferably 6 to 10. The number of carbon atoms of the alkylaryl group and the arylalkyl group is preferably 7 to 11. The number of carbon atoms of the alkoxy group is preferably 1 to 10. Examples of the alkyl group include a methyl group, an ethyl group, a propyl group, and a butyl group. Examples of the aryl group include a phenyl group. Examples of the alkylaryl group include a tolyl group. Examples of the arylalkyl group include a benzyl group. Examples of the alkoxy group include a methoxy group and an ethoxy group. Examples of the halogen atom include chlorine.

Among the structural units represented by formula (I), a structural unit derived from a diene compound is preferable.

This is because the thermoplastic resin having that structure can be easily produced. Examples of such a diene compound include isoprene, butadiene, 2-ethylbutadiene, and 2-butylbutadiene. One of these can be used, or two or more can be used in combination. Table 1 shows the relationship between an example of a diene compound and a kind of a group in the formula (I) derived from the diene compound.

TABLE 1

|   | $R_1$ | $R_2$ | $R_3$ | $R_4$ |
|---|---|---|---|---|
| Isoprene | $CH_3$ | H | H | H |
|  | H | $CH_3$ | H | H |
| Butadiene | H | H | H | H |
| 2-Ethyl butadiene | $C_2H_5$ | H | H | H |
|  | H | $C_2H_5$ | H | H |
| 2-Butyl butadiene | $C_4H_9$ | H | H | H |
|  | H | $C_4H_9$ | H | H |

Among these, a structural unit containing an alkyl group having 1 to 5 carbon atoms as $R_2$ is preferable because of the efficiency of reaction with oxygen, and a structural unit containing a methyl group (i.e., a structural unit derived from isoprene) as $R_2$ is more preferable. Isoprene is easily available and can be copolymerized with other monomers, so that it is preferable also in view of the production cost for the thermoplastic resin (B). Furthermore, butadiene is also preferable in that it is easily available and can be copolymerized with other monomers.

When the structural unit represented by formula (I) is derived from a diene compound, the ratio of the structural unit represented by formula (I) to all the structural units derived from the diene compound is preferably 10% or more, more preferably 20% or more, and even more preferably 30% or more. This ratio is made 10% or more by a generally known method in the art of causing anionic polymerization of the diene compound in an inactive organic solvent using a Lewis base as a cocatalyst.

In order to obtain the thermoplastic resin (B) having the structural unit represented by formula (I), when polymerizing monomers containing the diene compound, it is preferable to use a Lewis base as a cocatalyst. Examples of the Lewis base include ethers such as dimethyl ether, diethyl ether, methyl ethyl ether, and tetrahydrofran; glycol ethers such as ethylene glycol diethyl ether, and ethylene glycol dimethyl ether; tertiary amines such as N, N, N', N'-tetramethylethylenediamine (TMEDA) and triethylenediamine; ether-containing amines such as N-methyl morpholine and N-ethyl morpholine. The Lewis base is generally used in an amount 0.1 to 400 parts by weight with respect to 100 parts by weight of an initiator that will be described later.

The thermoplastic resin (B) used for the resin composition of the present invention is preferably a copolymer of an aromatic vinyl compound and the diene compound. When the thermoplastic resin (B) is such a copolymer, the carbon—carbon double bond moiety derived from the diene compound easily reacts with oxygen, so that the oxygen barrier properties and the oxygen scavenging function of the resultant resin composition can be improved. Moreover, by adjusting the copolymerization ratio between the aromatic vinyl compound and the diene compound, the melting behavior and the hardness of the thermoplastic resin (B) can be controlled. Furthermore, by adjusting the copolymerization ratio, the refractive index of the thermoplastic resin (B) can be made a desired value. Therefore it is possible to reduce the difference in the refractive index between the gas barrier resin (A) and the thermoplastic resin (B), and therefore a product having excellent transparency can be obtained.

Examples of the aromatic vinyl compound include styrene, 1-vinylnaphthalene, 2-vinylnaphthalene, 3-vinylnaphthalene, 2-methylstyrene, 3-methylstyrene, 4-methylstyrene, 4-propylstyrene, 4-cyclohexylstyrene, 4-dodecylstyrene, 2-ethyl-4-benzylstyrene, and 4-(phenylbutyl)styrene. Among these, styrene is the most preferable in view of cost and ease of polymerization. As the diene compound, the above-described compounds can be used, for example.

The copolymer of the aromatic vinyl compound and the diene compound may be in any form of a random copolymer, a block copolymer, a graft copolymer, or a composite thereof. A block copolymer is preferable in view of ease of production and mechanical properties of the resultant thermoplastic resin (B), ease of handling, and oxygen scavenging function.

In the block copolymer, the molecular weight of the aromatic vinyl compound block is preferably 300 to 100000, more preferably 1000 to 50000, and even more preferably 3000 to 50000. When the molecular weight of the aromatic vinyl compound block is less than 300, the melt viscosity of the thermoplastic resin (B) is low, and the moldability, the processability and the handling properties of the resultant resin composition may be degraded. Furthermore, the mechanical properties of a molded article that is formed from the resin composition may be poor. In addition, the dispersibility of the thermoplastic resin (B) to the gas barrier resin (A) is degraded, and the transparency, the gas barrier properties and the oxygen scavenging function may be degraded. On the other hand, when the molecular weight of the aromatic vinyl compound block exceeds 100000, the melt viscosity of the thermoplastic resin (B) is high, so that the thermoplastisity is impaired. Therefore, the moldability and the processability of the resultant resin composition may be degraded. In addition, the dispersibility of the thermoplastic resin (B) to the gas barrier resin (A) is degraded as that of the case described above, and the transparency, the gas barrier properties and the oxygen scavenging function may be degraded.

The block form of the block copolymer is for example, $X(YX)_n$, $(XY)_n$ or the like, wherein X is an aromatic vinyl compound block, Y is a diene compound block, and n is an integer of 1 or more. Among these, a diblock copolymer and a triblock copolymer are preferable, and a triblock copolymer is more preferable in view of its mechanical properties. In particular, it is preferable that the aromatic vinyl compound block is a polystyrene block, and the diene compound block is a polyisopropylene block in view of cost and ease of polymerization.

There is no particular limitation regarding the method for producing the block copolymer, but anionic polymerization is preferable. Specifically, the following methods, but not limited to, can be used. The aromatic vinyl compound and the diene compound are copolymerized with an alkyl lithium compound as an initiator, and coupled by a coupling agent. Alternatively, the diene compound and the aromatic vinyl compound are sequentially polymerized with a dilithium compound as an initiator. As the alkyl lithium compound, alkyl lithium compounds with an alkyl group having 1 to 10 carbon atoms, such as methyl lithium, ethyl lithium, benzyl lithium, n-butyl lithium, sec-butyl lithium, tert-butyl lithium and the like are preferable.

As the coupling agent, dichloromethane, dibromomethane, dichloroethane, dibromoethane, and the like can be used. Examples of the dilithium compound include naphthalenedilithium, oligostyryldilithium and dilithiohexylbenzene. The initiator and the coupling agent can be used preferably in an amount of 0.01 to 0.2 parts by weight and 0.04 to 0.8 parts by weight with respect to 100 parts by weight of all the monomers used for polymerization.

The thermoplastic resin (B) may have a functional group including a hetero atom. In particular, in the first resin composition and the second resin composition of the present invention, such a thermoplastic resin (B) is preferable because this can stabilize the morphology of the entire resin composition. Furthermore, when producing a multilayered container including a layer made of the resin composition, this can improve the impact delamination resistance of the multilayered structure of the container. There is no particular limitation regarding a method for producing the thermoplastic resin (B) having a functional group including a hetero atom. For example, a polymer containing an alkali metal at one or more terminals thereof is reacted with a specific end treatment agent that can react with the alkali metal at the terminal.

The following groups can be employed as the functional group including a hetero atom contained in the thermoplastic resin (B):

<I> Active Hydrogen-Containing Polar Groups
—$SO_3H$, —$SO_2H$, —SOH, —$NH_2$, —NHR, >C=NH, —$CONH_2$, —CONHR, —CONH—, —OH, and —SH <II> Nitrogen-Containing and Active Hydrogen-Free Polar Groups —$NR_2$, —NR—, >C=N—, —CN, —NCO, —OCN, —SCN, —NO, —$NO_2$, —NCS, —$CONR_2$, and —CONR—

<III> Epoxy Group or Thioepoxy Group-Containing Polar groups

<IV> Carbonyl group or thiocarbonyl group-containing polar groups
—CHO, —COOH, —COOR, —COR, >C=O, >C=S, —CHS, —CSOR, and —CSOH <V> Phosphorus-Containing Polar Groups
—$P(OR)_2$, —$P(SR)_2$, —$PO(OR)_2$, —$PO(SR)_2$, —$PS(OR)_2$, —$PS(SR)_2$, —PO(SR)(OR), and —PS(SR)(OR)

<VI> M-containing polar groups (M is any one of Si, Ge, Sn, and Pb)
—$MX_3$, —$MX_2R$, —$MXR_2$, and —$MR_3$ (In the above general formulae, R is an alkyl group, a phenyl group or an alkoxy group, and X is a halogen atom.)

As the solvent for production of the thermoplastic resin (B), organic solvents that are inactive with respect to the above-described initiators, coupling agents and the Lewis base can be used. Among these, a saturated hydrocarbon, a saturated cyclic hydrocarbon, and an aromatic hydrocarbon that have 6 to 12 carbon atoms are preferable. For example, hexane, heptane, octane, decane, cyclohexane, toluene, benzene, xylene, and the like can be used. The polymerization reaction for production of the thermoplastic resin (B) is generally performed at a temperature range of −20 to 80° C. for 1 to 50 hours.

For example, the thermoplastic resin (B) can be obtained by the following process of adding a polymerization reaction mixture dropwise into a poor solvent such as methanol, causing a reaction product to precipitate, and then heating or drying the recovered reaction product under reduced pressure. Alternatively, the thermoplastic resin (B) can be obtained by the process of adding a polymerization reaction mixture dropwise into boiling water to cause azeotrope to remove the solvent, and then heating or drying the resultant residue under reduced pressure. The double bonds present after polymerization can be partly reduced with hydrogen within the range not interfering with the effects of the resin composition of the present invention.

It is preferable that the tan δ primary dispersion peak temperature derived from the diene compound block of the thus obtained block copolymer is −40° C. to 60° C., more preferably, −20° C. to 40° C., and even more preferably, −10° C. to 30° C., in view of the oxygen scavenging function of the resultant resin composition. If the tan δ primary dispersion peak temperature is less than −40° C., the oxygen scavenging function of the resultant resin composition may be degraded. On the other hand, if the tan δ primary dispersion peak temperature is more than 60° C., the oxygen scavenging function of the resultant resin composition may be degraded, in particular, at low temperatures.

The molecular weight of the thermoplastic resin (B) is preferably 1000 to 500000, more preferably 10000 to 250000, and even preferably 40000 to 200000. If the molecular weight of the thermoplastic resin (B) is less than 1000, the dispersibility in the gas barrier resin (A) is degraded, so that the transparency, the gas barrier properties and the oxygen scavenging function may be degraded. If the molecular weight of the thermoplastic resin (B) is more than 500000, the processability of the resin composition may be deteriorated, in addition to the above-mentioned problems.

The thermoplastic resin (B) can be a single resin or a mixture of a plurality of resins. In either case, it is preferable that the internal haze value is 10% or less in a film having a thickness of 20 μm in order to obtain a molded article having good transparency.

In the first and the second resin compositions of the present invention, it is preferable that the difference in the refractive index between the thermoplastic resin (B) and the gas barrier resin (A) is 0.01 or less. When the difference in the refractive index between the gas barrier resin (A) and the thermoplastic resin (B) exceeds 0.01, the transparency of the obtained resin composition may deteriorate. The difference in the refractive index is more preferably 0.007 or less, and even more preferably 0.005 or less. When the gas barrier resin (A) includes two or more gas barrier resins (e.g., different two kinds of EVOH), the average of the refractive indices is calculated based on the refractive indices and the blend weight ratio of the two or more gas barrier resins, and this average is determined as the refractive index of the blend.

The thermoplastic resin (B) can contain an antioxidant. As the antioxidant, for example, the following compounds can be used: 2,5-di-tert-butylhydroquinone, 2,6-di-tert-butyl-p-cresol, 4,4'-thiobis(6-tert-butylphenol), 2,2'-methylene-bis(4-methyl-6-tert-butylphenol), octadecyl-3-(3',5'-di-tert-butyl-4'-hydroxyphenyl)propionate, 4,4'-thiobis(6-tert-butylphenol), 2-tert-butyl-6-(3-tert-butyl-2-hydroxy-5-methylbenzyl)-4-methylphenylacrylate, pentaerythritoltetrakis(3-laurylthiopropionate), 2,6-di-(tert-butyl)-4-methylphenol (BHT), 2,2-methylenebis(6-tert-butyl-p-cresol), triphenyl phosphite, tris(nonylphenyl) phosphite, dilauryl thiodipropionate and the like.

The amount of the antioxidant to be added is determined as appropriate, in view of the kinds and the contents of components of the resin composition, and the use and the storage conditions of the resin composition, and the like. In general, the amount of the antioxidant contained in the thermoplastic resin (B) is preferably 0.01 to 1% by weight, more preferably 0.02 to 0.5% by weight, based on the total weight of the thermoplastic resin (B) and the antioxidant. If a large amount of antioxidant is added, reaction of the thermoplastic resin (B) and oxygen is blocked, so that the oxygen barrier properties and the oxygen scavenging function of the resin composition of the present invention may be insufficient. On the other hand, if the amount of the anti-oxidant is too small, the reaction with oxygen proceeds during storage or melt-kneading of the thermoplastic resin (B), so that the oxygen scavenging function may be lowered before the resin composition of the present invention is actually put to use.

For example, in the case where the thermoplastic resin (B) is stored at a comparatively low temperature or under an inactive gas atmosphere, or the resin composition is produced by melt-kneading in a nitrogen-sealed state, the amount of the antioxidant can be small. In the case where an oxidation catalyst is added during melt mixing to facilitate oxidation, even though the thermoplastic resin (B) contains a certain amount of an antioxidant, a resin composition having good oxygen scavenging function can be obtained.

(Compatibilizer (C))

The compatibilizer (C) contained in the resin composition of the present invention is a compound for improving the compatibility between the gas barrier resin (A) and the thermoplastic resin (B) and providing the resultant resin composition with stable morphology. There is no particular limitation regarding the type of the compatibilizer (C), and the compatibilizer (C) can be selected according to the combination of the gas barrier resin (A) and the thermoplastic resin (B).

When the gas barrier resin (A) has a high polarity, such as polyvinyl alcohol resin, a hydrocarbon polymer containing a polar group or ethylene-vinyl alcohol copolymer is preferable as the compatibilizer (C). For example, when a hydrocarbon polymer containing a polar group is used as the compatibilizer (C), a polyhydrocarbon moiety in the polymer, the moiety accounting for the main portion, enhances the affinity between the compatibilizer (C) and the thermoplastic resin (B). The polar group in the polymer enhances the affinity between the compatibilizer (C) and the gas barrier resin (A). As a result, the resultant resin composition can be provided with stable morphology.

Examples of a monomer that can form the polyhydrocarbon moiety that accounts for the main portion of the hydrocarbon polymer containing a polar group include a-olefins such as ethylene, propylene, 1-butene, isobutene, 3-methyl pentene, 1-hexene, and 1-octene; styrenes such as styrene, α-methylstyrene, 2-methylstyrene, 4-methylstyrene, 4-propylstyrene, 4-tert-butylstyrene, 4-cyclohexylstyrene, 4-dodecylstyrene, 2-ethyl-4-benzylstyrene, 4-(phenylbutyl) styrene, 2,4,6-trimethylstyrene, monofluorostyrene, difluorostyrene, monochlorostyrene, dichlorostyrene, methoxystyrene, and tert-buthoxystyrene; vinylnaphthalenes such as 1-vinylnaphthalene, 2-vinylnaphthalene; aromatic compounds containing a vinylene group such as indene and acenaphthylene; and conjugated diene compounds such as butadiene, isoprene, 2,3-dimethyl butadiene, pentadiene, and hexadiene. The hydrocarbon polymer may contain primarily one of these monomers, or may contain primarily two or more as polymer unit(s).

The hydrocarbon polymer containing a polar group is prepared using one or more of the above-listed monomers, as described later, and the monomer forms a polyhydrocarbon moiety corresponding to one of the following polymers: an olefin copolymer such as polyethylene (very low density, low density, linear low density, medium density, and high density polyethylene), ethylene-(meth)acrylic ester (methyl ester, ethyl ester, etc.) copolymer, ethylene-vinyl acetate copolymer, ethylene-vinyl alcohol copolymer, polypropylene, ethylene-propylene copolymer; a styrene polymer such as polystyrene, styrene-acrylonitrile copolymer, styrene-acrylonitrile-butadiene copolymer, a styrene-diene compound block copolymer (styrene-isoprene block copolymer, styrene-butadiene copolymer, styrene-isoprene-styrene block copolymer, etc.), and a hydrogenated product thereof; a (meth)acrylic ester polymer such as polymethyl acrylate, polyethyl acrylate, and polymethyl methacrylate; a halogenated vinyl polymer such as polyvinyl chloride and vinylidene fluoride; a semi-aromatic polyester such as polyethylene terephthalate and polybutylene terephthalate; and an aliphatic polyester such as polyvalerolactone, polycaprolactone, polyethylene succinate, and polybutylene succinate. Among such compatibilizers, compounds that contain a monomer that is the same monomer contained in the thermoplastic resin (B) as a polymer component are preferable in many cases. For example, when the thermoplastic resin (B) contains polystyrene, the compatibilizer (C) preferably contains a polyhydrocarbon moiety corresponding to a styrene polymer such as polystyrene, styrene-diene block copolymer (e.g., styrene-isoprene block copolymer, styrene-butadiene copolymer, styrene-isoprene-styrene block copolymer), or a hydrogenated product thereof.

There is no particular limitation regarding the polar group contained in the compatibilizer (C), but a functional group containing an oxygen atom is preferable. More specifically, the following groups are preferred: active hydrogen-containing polar groups (—$SO_3H$, —$SO_2H$, —SOH, —$CONH_2$, —CONHR, —CONH—, —OH, etc.), nitrogen-containing polar groups that is free from active hydrogen (—NCO, —OCN, —NO, —$NO_2$, —$CONR_2$, —CONR—, etc.), an epoxy group, carbonyl group-containing polar groups (—CHO, —COOH, —COOR, —COR, >C=O, —CSOR, —CSOH, etc.), phosphorus-containing polar groups (—$P(OR)_2$, —$PO(OR)_2$, —$PO(SR)_2$, —$PS(OR)_2$, —PO(SR)(OR), —PS(SR)(OR), etc.), boron-containing polar groups and the like. In the above general formulae, R represents an alkyl group, a phenyl group or an alkoxy group.

There is no particular limitation regarding the method for producing the hydrocarbon polymer containing the polar group. For example, the following methods can be employed: 1) a method of copolymerizing a monomer that can form the polyhydrocarbon moiety and a monomer containing the polar group or a group that can form the polar group; 2) a method of utilizing an initiator or a chain transfer agent having the polar group or a group that can form the polar group when polymerizing monomers that can form the polyhydrocarbon moiety; 3) a method of subjecting a monomer that can form the polyhydrocarbon moiety to living polymerization and utilizing a monomer having the polar group or a group that can form the polar group as a terminator (end treatment agent); and 4) a method of obtaining a polymer by polymerizing monomers that can form the polyhydrocarbon moiety and introducing a monomer having the polar group or a group that can form the polar group to a reactive moiety of the polymer, for example, a carbon—carbon double bond moiety by a reaction. In the method 1, for copolymerization, any one of polymerization methods of random copolymerization, block copolymerization and graft copolymerization can be employed.

When the compatibilizer (C) is a hydrocarbon polymer, examples of the most preferable polar group of the compatibilizer (C) include a carboxyl group and a boron-containing polar group (e.g., a boronic acid group and a boron-containing group that can be converted to a boronic acid group in the presence of water). Hereinafter, these polar groups and the hydrocarbon polymers containing the polar group will be described sequentially.

In this specification, "a carboxyl group" includes carboxylic acid anhydride groups and carboxylate groups, in addition to a carboxyl group (—COOH). Among these, "carboxylate groups" refers to a residue of the carboxylic acid, in which all or a part of the carboxyl groups in the carboxylic acid is (are) present in the form of a metal salt. Examples of metals of the metal salt include alkali metals such as lithium, sodium, and potassium; alkaline-earth metals such as magnesium and calcium; and transition metals such as zinc, manganese, and cobalt. Among these, zinc is preferable in view of compatibility. When a hydrocarbon polymer having a carboxyl group is used as the compatibilizer (C), the thermal stability of the obtained resin composition is improved significantly.

There is no limitation regarding the method for preparing the hydrocarbon polymer containing a carboxyl group, but it is preferable to copolymerize a monomer that can form the polyhydrocarbon moiety and a monomer containing a carboxyl group or a carboxylic acid anhydride by the method 1. Among monomers that can be used in such a method, examples of monomers having a carboxyl group include acrylic acid, methacrylic acid, maleic acid, monomethyl maleate, monoethyl maleate, and itaconic acid. Among these, acrylic acid and methacrylic acid are preferable. The content of the carboxyl group in the polymer is preferably 0.5 to 20 mol %, more preferably 2 to 15 mol %, and even more preferably 3 to 12 mol %.

Furthermore, examples of monomers having a carboxylic acid anhydride group include itaconic anhydride and maleic anhydride, and in particular, maleic anhydride is preferable. The content of the carboxylic acid anhydride group in the polymer is preferably 0.0001 to 5 mol %, more preferably 0.0005 to 3 mol %, and even more preferably 0.001 to 1 mol %.

The carboxylate group is introduced to the polymer by, for example, a salt exchange reaction between a polymer having a carboxyl group or a carboxylic acid anhydride group prepared by the above-described method and a low molecular weight metal salt. The low molecular weight metal salt for this may contain one of the above-listed metals or two or more.

As counter ions of the metal in the low molecular weight metal salt, anions derived from organic acids or chloride can be employed. Examples of organic acids include acetic acid, strearic acid, dimethyldithiocarbamic acid, palmitic acid, 2-ethylhexanoic acid, neodecanoic acid, linoleic acid, tallic acid, oleic acid, resin acid, capric acid, and naphthenic acid. Examples of particularly preferable low molecular weight metal salts include cobalt 2-ethylhexanoate, cobalt neodecanoate, cobalt stearate, and cobalt acetate.

The neutralization degree of the resultant carboxylate group is preferably less than 100%, more preferably 90% or less, and even more preferably 70% or less, and the neutralization degree is preferably 5% or more, more preferably 10% or more, and even more preferably 30% or more. For example, it is preferably 5 to 90%, and more preferably 10 to 70%.

There is no particular limitation regarding the type of the hydrocarbon polymer containing a carboxyl group, but copolymers that can be obtained by copolymerizing α-olefin as the monomer that can form the polyhydrocarbon moiety and the monomer having a carboxyl group or a carboxylic acid anhydride group are preferable. Above all, a random copolymer is preferable in view of the thermal stability of the resultant resin composition.

Examples of the random copolymers include ethylene-acrylic acid copolymer (EAA), ethylene-methacylic acid copolymer (EMAA), and metal salts thereof. Among these, EMAA and metal salts thereof are preferable.

Furthermore, a copolymer obtained by grafting the monomer having a carboxyl group or a carboxylic acid anhydride group onto polyolefin can be used preferably. As the polyolefin for this, polyethylene (e.g., high density polyethylene (HDPE), low density polyethylene (LDPE), linear low density polyethylene (LLDPE), very low density polyethylene (VLDPE), or the like), polypropylene, copolymerized polypropylene and ethylene-vinyl acetate copolymer are preferable. As the monomer to be grafted, maleic anhydride is preferable.

The hydrocarbon polymer having a carboxyl group may contain the following monomers as a copolymer component: vinyl esters such as vinyl acetate, and vinyl propionate; unsaturated carboxylic acid ester such as methyl acrylate, ethyl acrylate, isopropyl acrylate, isobuty acrylate, n-butyl acrylate, 2-ethylhexyl acrylate, methyl methacrylate, isobutyl methacrylate, and diethyl maleate; carbon monoxide or the like.

The melt flow rate (MFR) (190° C., under a 2160 g load) of the polymer containing a carboxyl group is generally 0.01 g/10 min or more, preferably 0.05 g/10 min or more, and more preferably 0.1 g/10 min or more. The MFR is generally 50 g/10 min or less, preferably 30 g/10 min or less, and more preferably 10 g/10 min or less.

When the polar group contained in the compatibilizer (C) is a boron-containing polar group, the boron-containing polar group is preferably a boronic acid group or a boron-containing group that can be converted to a boronic acid group in the presence of water, as described above. The boronic acid group is the residue of boric acid, in which an OH group of the boric acid is removed, and expressed by formula (II) below.

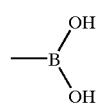

(II)

"Boron-containing group that can be converted to a boronic acid group in the presence of water" refers to a boron-containing group that can be converted to the boronic acid group expressed by formula (II) by being hydrolyzed in the presence of water. More specifically, it means a functional group that can be converted to a boronic acid group when a hydrolysis is conducted using water alone, a mixture of water and an organic solvent (toluene, xylene, acetone, etc.) or using a mixture of a 5% boric acid aqueous solution and an organic solvent as the solvent at a temperature that is in the range of room temperature to 150° C. for 10 minutes to 2 hours. Typical examples of such a functional group include a boronic acid ester group expressed by formula (III), a boronic anhydride group expressed by formula (IV), and a boronate group expressed by formula (V).

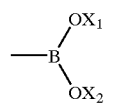

(III)

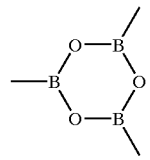

(IV)

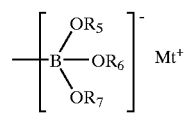

(V)

where $X_1$ and $X_2$ are a hydrogen atom, aliphatic hydrocarbon groups (e.g., linear or branched alkyl groups or alkenyl groups having 1 to 20 carbon, atoms), alicyclic hydrocarbon groups (e.g., cycloalkyl groups or cycloalkenyl groups), or aromatic hydrocarbon groups (e.g., phenyl group or biphenyl group), and $X_1$ and $X_2$ can be the same or different from each other. However, $X_1$ and $X_2$ are not both hydrogen atoms at the same time. $X_1$ and $X_2$ can be bonded to each other. $R_5$, $R_6$, and $R_7$ are a hydrogen atom, aliphatic hydrocarbon groups, alicyclic hydrocarbon groups, or aromatic hydrocarbon groups as employed for $X_1$ and $X_2$, and can be the same or different from each other. Mt represents an alkali metal. $X_1$, $X_2$, $R_5$, $R_6$, and $R_7$ can include other groups, for example, a carboxyl group, a halogen atom or the like.

The hydrocarbon polymer having the boron-containing polar group as described above exhibits an excellent performance as a compatibilizer. For example, when a multi-layered container in which a layer made of a resin composition containing such a polymer and a PES layer are in direct contact with each other is produced, the impact delamination resistance can be improved significantly.

Specific examples of the boronic acid ester group expressed by formula (III) include boronic acid dimethyl ester group, boronic acid diethyl ester group, boronic acid dipropyl ester group, boronic acid diisopropyl ester group, boronic acid dibutyl ester group, boronic acid dihexyl ester group, boronic acid dicyclohexyl ester group, boronic acid ethylene glycol ester group, boronic acid propylene glycol ester group, boronic acid 1,3-propanediol ester group, boronic acid 1,3-butane diol ester group, boronic acid neopentyl glycol ester group, boronic acid catechol ester group, boronic acid glycerin ester group, and boronic acid trimethylolethane ester group.

As the boronate group expressed by the general formula (V) above, alkali metal boronate groups can be employed. Specific examples thereof include sodium boronate groups and potassium boronate groups.

There is no limitation regarding the content of the boron-containing polar group in the thermoplastic resin (B) having a boron-containing polar group as the functional group including a hetero atom, but 0.0001 to 1 meq/g (milliequivalents/g) is preferable, and 0.001 to 0.1 meq/g is more preferable.

There is no particular limitation regarding the method for producing the hydrocarbon polymer having the boron-containing polar group. Any of the methods 1 to 4 above can be used. Among these, methods 1, 2, and 4 will be described by way of typical examples.

By the method 1 (a method of copolymerizing a monomer that can form the polyhydrocarbon moiety and a monomer having a polar group or a group that can form a polar group), a monomer having a boron-containing polar group and a monomer that can form the polyhydrocarbon moiety (an olefin polymer moiety, a vinyl polymer moiety, a diene polymer moiety, etc.) are copolymerized so that a hydrocarbon polymer having a boron-containing polar group can be obtained. Examples of the monomer having a boron-containing polar group include 3-acryloylaminobenzeneboronic acid, 3-acryloylaminobenzeneboronic acid ethylene glycol ester, 3-methacryloylaminobenzeneboronic acid, 3-methacryloylaminobenzeneboronic acid ethylene glycol ester, 4-vinylphenylboronic acid, and 4-vinylphenylboronic acid ethylene glycol ester.

The hydrocarbon polymer having a boron-containing polar group can be obtained by the method 2, which comprises radically polymerizing a monomer that can form the polyhydrocarbon moiety (a monomer that can form an olefin polymer, a vinyl polymer, or a diene polymer) using a thiol having a boron-containing polar group as a chain transfer agent. The resultant polymer has a boron-containing polar group at its terminal.

The thiol having a boron-containing polar group (e.g., boronic acid group) can be obtained, for example, by reacting thiol having a double bond and diborane or a borane complex in a nitrogen atmosphere, and then adding alcohol or water. As the thiol having a double bond, which is a raw material, 2-propene-1-thiol, 2-methyl-2-propene-l-thiol, 3-butene-1-thiol, 4-pentene-1-thiol or the like can be used. Among these, 2-propene-l-thiol and 2-methyl-2-propene-l-thiol are preferable. Preferable examples of the borane complex include borane-tetrahydrofuran complex, borane-dimethyl sulfide complex, borane-pyridine complex, borane-trimethylamine complex, and borane-triethylamine complex. Among these, borane-tetrahydrofuran complex and borane-dimethyl sulfide complex are preferable. The amount of the diborane or the borane complex added is preferably about equal to the amount of the thiol having a double bond. The reaction temperature is preferably in the range from room temperature to 200° C. As a solvent, ether solvents such as tetrahydrofuran (THF) and diglyme; saturated hydrocarbon solvents such as hexane, heptane, ethylcyclohexane, and decalin, or the like can be used. Among these, THF is preferable. As the alcohols added after the reaction, lower alcohols such as methanol and ethanol are preferable, and methanol is more preferable.

As the polymerization conditions to obtain a polymer having a boron-containing polar group at its terminal, it is preferable to use an azo initiator or peroxide initiator, and to employ a polymerization temperature in the range from room temperature to 150° C. The amount of the thiol having boron-containing polar group to be added is preferably about 0.001 to 1 millimoles per 1 g of the monomer. There is no limitation regarding the method for adding the thiol, but when using a monomer that easily performs a chain transfer reaction such as vinyl acetate or styrene, it is preferable to add the thiol during polymerization. When using a monomer that does not easily perform a chain transfer reaction such as methyl methacrylate, it is preferable that the thiol is added prior to polymerization reaction.

There are two methods that will be described as follows for the method 4 in which the monomer that can form the polyhydrocarbon moiety is polymerized to obtain a polymer and a monomer having the polar group (boron-containing polar group) is introduced to a reactive moiety in the polymer.

Method 4-1: The hydrocarbon polymer having the boron-containing polar group can be obtained by producing a thermoplastic resin having a boronic acid dialkyl ester group by the process of reacting a polymer having a carbon—carbon double bond with a borane complex and boric acid trialkyl ester in a nitrogen atmosphere, and then, if necessary, reacting water or alcohols therewith. In this method, the boron-containing polar group is introduced to the carbon—carbon double bond of the polymer having a carbon—carbon double bond by an addition reaction. In this production method, if a polymer having a double bond at its terminal is used as the raw material, a hydrocarbon polymer having a boron-containing polar group at its terminal can be obtained. If a polymer having a double bond at its side chain or main chain is used as the raw material, a hydrocarbon polymer having a boron-containing polar group at its side chain can be obtained.

Since an olefin polymer generally has a double bond at its terminal to a small extent, it can be used as a raw material in the above-described production method. Examples of other methods for producing a polymer having a carbon—carbon double bond include a method of pyrolyzing an olefin polymer in an atmosphere free from oxygen to produce an olefin polymer having a double bond at its terminal, and a method of using an olefin monomer and a diene polymer as the raw materials to produce a copolymer thereof.

Preferable examples of the borane complex used for the above reaction include the borane complexes described above in the method 2. Among those, borane-trimethylamine complex and borane-triethylamine complex are more preferable. The amount of the borane complex to be employed is preferably ⅓ mols to 10 mols with respect to one mol of the carbon—carbon double bond of the thermoplastic resin.

Preferable examples of the boric acid trialkyl ester include boric acid lower alkyl esters such as trimethyl borate, triethyl borate, tripropyl borate, and tributyl borate. The amount of boric acid trialkyl ester to be used is preferably 1 mol to 100 mols with respect to one mol of the carbon—carbon double bond of the thermoplastic resin. It is not necessary to use a solvent, but if a solvent is used, a saturated hydrocarbon solvent such as hexane, heptane, octane, decane, dodecane, cyclohexane, ethylcyclohexane, and decalin are preferable.

The reaction temperature is generally in the range from room temperature to 300° C., preferably 100 to 250° C., and the reaction is performed at a temperature in this range for 1 min to 10 hours, preferably 5 min to 5 hours.

The boronic acid dialkyl ester group introduced to the thermoplastic resin by the above-described reaction can be converted to a boronic acid group by hydrolysis by a method generally utilized in the art. Alternatively, the boronic acid dialkyl ester group can be converted to a desired boronic acid ester group by transesterification with an alcohol by a regular method. Furthermore, the boronic acid dialkyl ester group can be converted to a boronic anhydride group by heating for dehydration polycondensation, or converted to a boronate group by being reacted with a metal hydroxide or a metal alcoholate by a regular method.

The conversion of the boron-containing functional group as described above is performed, in general, using an organic solvent such as toluene, xylene, acetone and ethyl acetate. Examples of the alcohol include monohydric alcohols such as methanol, ethanol, and butanol; polyhydric alcohols such as ethylene glycol, propylene glycol, 1,3-propanediol, 1,3-butanediol, neopentyl glycol, glycerin, trimethylolethane, pentaerythritol, and dipentaerythritol. Examples of the metal hydroxide include hydroxides of alkali metals such as sodium and potassium. Examples of the metal alcoholate include metal alcoholate formed from the above-listed metal and the above-listed alcohol. These substances are not limited to those listed above. Their amounts are generally 1 to 100 mols with respect to one mol of the boronic acid dialkyl ester group.

Method 4-2: The hydrocarbon polymer having a boron-containing polar group can be obtained by an amidation of a polymer containing a carboxyl group that is generally known in the art through the use of an amino group-containing boronic acid such as m-aminophenylbenzeneboronic acid or an amino group-containing boronic ester such as m-aminophenylboronic acid ethylene glycol ester by a regular method. For the reaction, a condensing agent such as carbodiimide can be used.

Examples of the polymer containing a carboxyl group include the following polymers, but are not limited thereto: a polymer that is a semi-aromatic polyester resin (PET, etc.) or aliphatic polyester resin that contains a carboxyl group at its terminal; a polymer that is a polyolefin resin, a styrene resin, a (meth)acrylate resin, or a halogenated vinyl resin, in which a monomer unit having a carboxyl group such as acrylic acid, methacrylic acid, itaconic acid, citraconic acid, fumaric acid, or maleic anhydride is introduced by copolymerization; and a polymer that is the above-described thermoplastic resin containing an olefinic double bond, in which maleic anhydride or the like is introduced by addition reaction.

The melt flow rate (MFR) (230° C., under a 2160 g load) of the hydrocarbon polymer containing a boron-containing polar group is preferably 0.1 to 100 g/10 min, and more preferably 0.2 to 50 g/10 min.

As the compatibilizer (C), as described above, an ethylene-vinyl alcohol copolymer can be used. In particular, when the gas barrier resin (A) is EVOH, its effect as the compatibilizer is exhibited sufficiently. Among these, an ethylene-vinyl alcohol copolymer having an ethylene content of 70 to 99 mol % and a degree of saponification of 40% or more is preferable to improve the compatibility. The ethylene content is more preferably 72 to 96 mol %, even more preferably 72 to 94 mol %. When the ethylene content is less than 70 mol %, the affinity with the thermoplastic resin (B) may be deteriorated. When the ethylene content is more than 99 mol %, the affinity with the EVOH may be deteriorated. Furthermore, the degree of saponification is preferably 45% or more. There is no limitation regarding the upper limit of the degree of saponification, and an ethylene-vinyl alcohol copolymer having a degree of saponification of substantially 100% can be used. When the degree of saponification is less than 40%, the affinity with the EVOH may be deteriorated.

The melt flow rate (MFR) (210° C., under a 2160 g load) of the ethylene-vinyl alcohol copolymer is preferably 0.1 g/10 min or more, and more preferably 0.5 g/10 min or more. The MFR is preferably 100 g/10 min or less, more preferably 50 µl 10 min or less, and even more preferably 30 g/10 min or less.

The above-described compatibilizer (C) can be used alone or in combination of two or more.

When a multilayered container such as bottles constituted by a multilayered structure in which a layer made of the resin composition of the present invention containing the compatibilizer (C) and a layer of PES are in direct contact with each other is produced by, for example, coinjection stretch blow molding, the adhesion between the resin composition and the PES becomes high so that a high impact delamination resistance can be obtained. Also from this viewpoint, the significance of the present invention is large.

Furthermore, when the compatibilizer (C) has a carboxyl group, the resultant resin composition has a high thermal stability. As described later, when the resin composition contains an excessive amount of a transition metal salt (D), the thermal stability of the resin composition may be deteriorated, but when compatibilizer (C) having a carboxyl group is contained together with the transition metal salt (D), the thermal stability of the resin composition can be maintained. The reason of this significant effect is not clear, but it seems that this is caused by interaction between the compatibilizer (C) and the transition metal salt (D) as described below.

(Transition Metal Salt (D))

The second resin composition and the fourth resin composition of the present invention should contain a transition metal salt (D). It is preferable that the first resin composition and the third resin composition of the present invention contain a transition metal salt (D). The transition metal salt (D) has the effect of improving the oxygen scavenging function of the resin composition by facilitating the oxidation reaction of the thermoplastic resin (B). For example, the transition metal salt (D) facilitates a reaction of the thermoplastic resin (B) and oxygen present inside a packaging material obtained from the resin composition of the present invention as well as a reaction of the thermoplastic resin (B) and oxygen that passes through the packaging material, so that the oxygen barrier properties and the oxygen scavenging function of the packaging material can be improved.

In the first resin composition and the second resin composition of the present invention, the transition metal salt (D) is preferably contained in an amount of 1 to 5000 ppm in terms of the metal element. In other words, the transition metal salt (D) is contained in a ratio of 1 to 5000 parts by weight in terms of the metal element with respect to the total amount of the gas barrier resin (A), the thermoplastic resin (B) and the compatibilizer (C) of 1,000,000 parts by weight. More preferably, the transition metal salt (D) is contained in the range of 5 to 1000 ppm, and even more preferably 10 to 500 ppm. If the content of the transition metal salt (D) is less than 1 ppm, the effect of the addition is insufficient. On the other hand, if the content of the transition metal salt (D) is more than 5000 ppm, the thermal stability of the resin composition of the present invention may be degraded, and decomposed gas, gels or aggregates may be generated significantly.

In the third resin composition and the fourth resin composition of the present invention, the transition metal salt is preferably contained in an amount of 1 to 50000 ppm in terms of the metal element on the basis of the total amount of the thermoplastic resin (B) and the compatibilizer (C). More preferably, the transition metal salt (D) is contained in a ratio of 5 to 10000 ppm, even more preferably 10 to 5000 ppm. If the content of the transition metal salt (D) is less than 1 ppm, the effect of the addition may be insufficient. On the other hand, if the content of the transition metal salt (D) is more than 50000 ppm, the thermal stability of the resin composition of the present invention may be degraded, and decomposed gas, gels or aggregates may be generated significantly.

Examples of the transition metal contained in the transition metal salt (D) include, but are not limited to, iron, nickel, copper, manganese, cobalt, rhodium, titanium, chromium, vanadium, and ruthenium. Among these metals, iron, nickel, copper, manganese, and cobalt are preferable, with manganese and cobalt being more preferable, and cobalt being even more preferable.

Examples of counter ions of the metal contained in the transition metal salt (D) include anions derived from organic acids or chlorides. Examples of the organic acids include, but are not limited to, acetic acid, stearic acid, acetylacetone, dimethyldithiocarbamic acid, palmitic acid, 2-ethylhexanoic acid, neodecanoic acid, linoleic acid, tallic acid, oleic acid, resin acid, capric acid, and naphthenic acid. Especially preferred salts are cobalt 2-ethylhexanoate, cobalt neodecanoate, and cobalt stearate. The metal salt may be a so-called ionomer having a polymeric counter ion.

(Resin Composition)

The first resin composition and the second resin composition of the present invention preferably contain 40 to 99.8 wt % of gas barrier resin (A), 0.1 to 30 wt % of the thermoplastic resin (B) and 0.1 to 30 wt % of the compatibilizer (C). If the content of the gas barrier resin (A) is less than 40 wt %, the molded article such as a multilayered container formed of the resin composition has poor transparency and poor gas barrier properties against oxygen gas, carbon dioxide gas or the like. On the other hand, when the content exceeds 99.8 wt %, the content of thermoplastic resin (B) and the compatibilizer (C) becomes small, and therefore the oxygen barrier properties and the oxygen scavenging function may deteriorate, and the stability of the morphology of the entire resin composition may be impaired. The content of the gas barrier resin (A) is preferably 60 to 99 wt %, more preferably 80 to 98 wt %, and even more preferably 85 to 97 wt %.

The content of the thermoplastic resin (B) is more preferably 1 to 20 wt %, and even more preferably 2 to 15 wt %. The content of the compatibilizer (C) is more preferably 0.5 to 20 wt %, and even more preferably 1.0 to 10 wt %.

In the third resin composition and the fourth resin composition, it is preferable that the thermoplastic resin (B) is contained in an amount of 1 to 99 wt %, and the compatibilizer (C) is contained in an amount of 1 to 99 wt %. The content of the thermoplastic resin (B) is more preferably 5 to 95 wt %, even more preferably 30 to 90 wt %, and most preferably 50 to 90 wt %. The content of the compatibilizer (C) is more preferably 5 to 95 wt %, even more preferably 10 to 70 wt %, and most preferably 10 to 50 wt %.

The oxygen absorption rate of the first resin composition of the present invention is required to be 0.001 ml/m$^2$·day or more, preferably 0.01 ml/m$^2$·day or more, and more preferably 0.05 ml/m$^2$·day or more. When the oxygen absorption rate is less than 0.001 ml/m$^2$·day, the oxygen barrier properties and the oxygen scavenging effect of a molded article formed of the resultant resin composition may be insufficient. It is preferable that the second resin composition of the present invention also has an oxygen absorption rate of the above-described values or more.

The oxygen absorption rate of the third resin composition of the present invention should be 0.1 ml/m$^2$·day or more, preferably 0.5 ml/m$^2$·day or more, more preferably 1 ml/m$^2$ day or more, and even more preferably 10 ml/m$^2$·day or more. It is preferable that the fourth resin composition of the present invention also has an oxygen absorption rate of the above-described values or more. The oxygen absorption rate is the volume of oxygen absorbed by a film of the resin composition per unit surface area in a unit period of time, when the film is left in air with a predetermined volume. A specific method for measuring the rate will be described in the examples later.

The first and the second resin compositions of the present invention may contain a thermoplastic resin (E) other than the gas barrier resin (A), the thermoplastic resin (B) and the compatibilizer (C) to the extent that does not impair the effects of the present invention. The third and the fourth resin compositions of the present invention also may contain a thermoplastic resin (E) other than the thermoplastic resin (B) and the compatibilizer (C) to the extent that does not impair the effects of the present invention. Examples of the thermoplastic resin (E) include, but are not limited to, polyethylene, polypropylene, ethylene-propylene copolymer, a copolymer including ethylene or propylene (e.g., a copolymer including ethylene or propylene and at least one of the following monomers as a copolymer component: α-olefins such as 1-butene, isobutene, 4-methyl-1-pentene, 1-hexene, and 1-octene; unsaturated carboxylic acids such as itaconic acid, methacrylic acid, acrylic acid, and maleic anhydride, and their salts, their partial or complete esters, their nitriles, their amides, and their anhydrides; carboxylic acid vinylesters such as vinyl formate, vinyl acetate, vinyl propionate, vinyl butylate, vinyl octanoate, vinyl dodecanoate, vinyl stearate, and vinyl arachidonate; vinylsilane compounds such as vinyltrimethoxysilane; unsaturated sulfonic acids and their salts; alkylthiols; vinyl pyrrolidones and the like), polyolefins such as poly-4-methyl-1-pentene and poly-1-butene; polyesters such as polyethylene terephthalate, polybutylene terephthalate, and polyethylene naphthalate; polystyrene, polycarbonates, and polyacrylates.

When selecting the thermoplastic resin (E) contained in the resin composition of the present invention, it is preferable to consider the compatibility between the thermoplastic resin (E) and the gas barrier resin (A) and the compatibility between the thermoplastic resin (E) and the thermoplastic resin (B). Such compatibility may affect the gas barrier properties, clarity, oxygen scavenging properties, mechanical properties of the resultant product, the texture of the product itself and the like.

In the resin composition of the present invention, various additives can be added within the range not interfering with the function and the effects of the present invention. Examples of such additives include an antioxidant, a plasticizer, a thermal stabilizer (melt stabilizer), a photoinitiator, a deodorant, an ultraviolet absorber, an antistatic agent, a lubricant, a colorant, a filler, a drying agent, a filling agent, a pigment, a dye, a processing aid, a flame retarder, an antifogging agent, or other polymer compounds. Among these, the thermal stabilizer (i), the photoinitiator (ii) and the deodorant (iii) will be described below.

As the thermal stabilizer (i), which is among the above additives, one or more substances selected from hydrotalcite compounds and metal salts of higher aliphatic carboxylic acids can be used. These compounds can prevent generation of gels or fisheyes, and can further improve the stability in long term operation. It is preferable that these compounds are contained in an amount of 0.01 to 1 wt % with respect to the whole resin composition.

As the metal salts of higher aliphatic carboxylic acids, metal salts of higher fatty acids having 8 to 22 carbon atoms are preferable. Examples of higher fatty acids having 8 to 22 carbon atoms include lauric acid, stearic acid, and myristic acid. Examples of the metals of the metal salts include sodium, potassium, magnesium, calcium, zinc, barium and aluminum. Among these, alkaline-earth metals such as magnesium, calcium and barium are preferred. Among such metal salts of higher aliphatic carboxylic acids, calcium stearate and magnesium stearate are preferred.

The photoinitiator (ii) of the above-described additives is used to initiate or promote scavenging of oxygen in molded articles, packaging films, multilayered structures made of the resin composition of the present invention. In particular, when the resin composition contains an antioxidant, it is preferable that the resin composition contains a photoinitiator as well. When the resin composition containing a photoinitiator is irradiated with light at a desired time, a reaction between the thermoplastic resin (B) and oxygen is promoted, so that an induction period of scavenging oxygen of the resin composition decreases or disappears. As a result, the oxygen-scavenging function of the resin composition can be exhibited promptly. Herein, "induction period" refers to a period required for the resin composition of the present invention to fully initiate the capture of oxygen.

Non-exhaustive examples of the photoinitiator include benzophenone, o-methoxybenzophenone, acetophenone, o-methoxyacetophenone, acenaphthenequinone, methyl ethyl ketone, valerophenone, hexanophenone, α-phenylbutyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, α-tetralone, 9-acetylphenanthrene, 2-acetylphenanthrene, 10-thioxanthone, 3-acetylphenanthrene, 3-acetylindole, 9-fluorenone, 1-indanone, 1,3,5-triacetylbenzene, thioxanthen-9-one, xanthen-9-one, 7-H-benz[de]anthracen-7-one, benzoin tetrahydropyranyl ether, 4,4',-bis(dimethylamino)benzophenone, 1'-acetonaphthone, 2'-acetonaphthone, 2,3-butanedione, benz[a]anthracene-7, 12-dione, 2,2-dimethoxy-2-phenylacetophenone, α, α-diethoxyacetophenone, and α, α-dibuthoxyacetophenone. In addition to the compounds, singlet oxygen generation photosensitizers such as rose bengal, methylene blue, and tetraphenylporphyrin and polymer initiators such as, poly-(ethylene-carbon monoxide) and oligo-[2-hydroxy-2-methyl-1-[4-(1-methylvinyl)-phenyl]-propanone] can be used as the photoinitiator.

The amount of the photoinitiator to be used can be selected as appropriate, depending on the type of the thermoplastic resin (B) to be used, the wavelength and the intensity of light to be employed, the properties and the quantity of the antioxidant to be used, the type of the photoinitiator, and the form of the resin composition of the present invention when it is in practical use. For example, when the molded article made of the resin composition of the present invention is slightly opaque, a relatively large amount of photoinitiator is required. In general, the amount of the photoinitiator to be used is preferably in the range from 0.01 to 10 wt % of the total amount of the resin composition.

As light to be used for irradiation, for example, ultraviolet rays having a wavelength of about 200 to 750 nanometer (nm), preferably about 200 to 400 nm or visible light is useful. These lights have relatively long wavelengths, so that they are preferable in view of the cost and the influence on the human body. The amount of light for irradiation is preferably 0.1 joules (J) or more per g of the thermoplastic resin (B) contained in the resin composition of the present invention, and generally 10 to 100 J. In addition to the above-described lights, electron beams or ionized radiation such as gamma rays, X-rays, corona discharge or the like can be used in a radiation amount of about 0.2 to 20 Mrad, preferably about 1 to 10 Mrad. The irradiation of the light is preferably performed in the presence of oxygen. The time of light irradiation can be selected as appropriate, depending on the amount and the type of the photoinitiator, the shape (thickness, etc.) of the molded article, the amount of the antioxidant, and the wavelength and the intensity of the light.

There is no limitation regarding the time of the light irradiation, as long as it is before the time when the oxygen scavenging function of the resin composition of the present invention is required. For example, when the resin composition of the present invention is used as a packaging material, light irradiation can be performed, either before, during or after packaging. It is preferable to irradiate the resin composition in the form of, for example, a flat sheet, with light for uniform irradiation of light.

Among the additives as described above, a deodorant (or a deodorizer or an adsorbent; which are also referred to as "deodorant" in the following) is used to reduce odor caused by low molecular weight by-products that are produced accompanied by the oxygen scavenging of the resin composition of the present invention.

There is no particular limitation regarding the type of the deodorant (iii), but zinc compounds, aluminum compounds, silicon compounds, iron (II) compounds, compositions containing a zinc compound and a silicon compound, compositions containing a zinc compound and an aluminum compound, organic acids, iron (II) compound—organic acid compositions or the like can be used. These can be used alone or in the form of a mixture of a plurality of kinds or a double salt.

Examples of the zinc compounds include zinc silicate, zinc oxide, zinc sulfate, zinc chloride, zinc phosphate, zinc nitrate, zinc carbonate, zinc acetate, zinc oxalate, zinc citrate, zinc fumarate, and zinc formate.

Examples of the aluminum compounds include aluminum sulfate, aluminum phosphate, aluminum silicate, and potassium aluminum sulfate.

Examples of the silicon compounds include silicon dioxide; silicon phosphate compounds such as silicon orthophosphate, silicon pyrophosphate (form I), and silicon pyrophosphate (form II); and activated silica gel.

There is no particular limitation regarding the iron (II) compound, as long as it forms a bivalent iron ion, and examples thereof include inorganic salts such as iron (II) sulfate, iron (II) chloride, iron (II) nitrate, iron (II) bromide and iron (II) iodide, and organic salts such as iron (II) gallate, iron (II) malate and iron (II) fumarate. Among these, iron (II) sulfate and iron (II) chloride are preferable.

A composition (mixture or double salts) containing a zinc compound and a silicon compound also can be used preferably. As a specific example of this composition, substantially irregular fine particles of zinc silicate composed of zinc oxide and silicon dioxide in a weight ratio of 1:5 to 5:1, the majority of which has an amorphous structure, are preferable. The ratio of the zinc oxide and the silicon dioxide is preferably 1:4 to 4:1, and more preferably 1:3 to 3:1.

A composition of a zinc compound and an aluminum compound is also preferably used. As a specific example of this composition, a mixture of zinc oxide and/or zinc carbonate and aluminum sulfate and/or potassium aluminum sulfate is preferable, and it contains 1 to 1000 parts by weight, preferably 30 to 300 parts by weight of the aluminum compound with respect to 100 parts by weight of the zinc compound.

As organic acids, an organic acid having at least 8 carbon atoms, such as aliphatic monocarboxylic acids, aliphatic polycarboxylic acids, aromatic monocarboxylic acids, and aromatic polycarboxylic acids are preferable, and aromatic polycarboxylic acids are particularly preferable. Examples of the aromatic polycarboxylic acids include phthalic acid, terephthalic acid, isophthalic acid, trimellitic acid, 1,2,3-benzenetricarboxylic acid, 1,3,5-benzenetricarboxylic acid, pyromellitic acid, benzenehexacarboxylic acid, naphthalenedicarboxylic acid, naphthalenetricarboxylic acid, naphthalenetetracarboxylic acid, diphenyltetracarboxylic acid, diphenyl ether tetracarboxylic acid, azobenzenetetracarboxylic acid and anhydrides thereof. Among these, benzenetricarboxylic acids, and in particular, trimellitic acid are preferable.

As iron (II) compounds used for the iron (II) compound-organic acid compositions, compounds forming bivalent iron ions when dissolved in water as described above can be used. There is no limitation regarding the organic acid, as long as it can be dissolved in water, and for example, ascorbic acids such as ascorbic acid (D- and L-), isoascorbic acid, and metal salts thereof, and carboxylic acids such as citric acid, isocitric acid, lactic acid, tartaric acid, and malic acid can be used. Among these, L-ascorbic acid is preferable. In this case, a mixture of two or more iron (II) compounds and/or two or more organic acids can be used.

It is preferable that in the iron (II) compound—organic acid composition, an iron (II) compound and an organic acid contained therein are bonded to each other. Such a composition can be prepared by, for example, dissolving and mixing the two components into water to obtain an aqueous solution, and then, removing the water by spray-drying, freeze-drying or the like to form a powder. The weight ratio of the iron (II) compound to the organic acid is preferably 1:0.01 to 1:1, and more preferably 1:0.02 to 1:0.8. In the case where the organic acid component is an ascorbic acid, the weight ratio of the iron (II) compound to the organic acid is preferably 1:0.02 to 1:0.3, more preferably 1:0.02 to 1:0.13, and even more preferably 1:0.05 to 1:0.13. It is preferable to add alum as a stabilizer for the deodorizing function to the iron (II) compound-organic acid composition in an amount of 2 to 20 wt % with respect to the total amount of the iron (II) compound and the organic acid. There is no particular limitation regarding the alum, but potassium alum, ammonium alum and sodium alum are preferable.

As other deodorants, it is possible to use compositions in which a metal compound comprising a zinc compound and a polycarboxylic acid are stabilized, biological enzyme model compounds such as iron (II)-phthalocyanine derivatives, tree saps or extracts of plants such as paulownia, holly tree, devilwood, Japanese silverleaf, butterbur, lilac, Chinese golden bell, chestnut, and alder; aluminosilicates such as zeolite; hydrated magnesium silicate clay minerals such as sepiolite, silotile, barigorskite, and raphrynite; and activated humic acid, activated alumina, and activated carbon. Porous adsorbents can also be used.

The content of the deodorant is preferably 0.1 wt % or more of the entire resin composition, more preferably 0.2 to 50 wt % and even more preferably 0.5 to 10 wt %.

A preferable melt flow rate (MFR) (210° C., 2160 g load, according to JIS K7210) of the resin composition of the present invention is 0.1 to 100 g/10 min, more preferably 0.5 to 50 g/10 min, and even more preferably 1 to 30 g/10 min. When the melt flow rate of the resin composition of the present invention fails to fall within the above range, the processability in melt-molding may become poor in many cases.

It is preferable that in the first and the second resin compositions of the present invention, the particles of the thermoplastic resin (B) are dispersed in the matrix containing the gas barrier resin (A). A molded article made of such a resin composition has good transparency, gas barrier properties and oxygen scavenging function. In this case, it is preferable that the average particle size of the thermoplastic resin (B) is 10 $\mu$m or less. When the average particle size is more than 10 $\mu$m, the area of the interface between the thermoplastic resin (B) and the matrix made of the gas barrier resin (A) and the like becomes small, so that the oxygen gas barrier properties and the oxygen scavenging function may be degraded. The average particle size of the particles of the thermoplastic resin (B) is preferably 5 $\mu$m or less, more preferably 2 $\mu$m or less.

(Processing of Resin Composition)

The components of the resin composition of the present invention are mixed and formed into a desired product. The method for mixing the components of the resin composition of the present invention is not limited to a particular method. The components can be mixed in any order. For example, when mixing the gas barrier resin (A), the thermoplastic resin (B), the compatibilizer (C) and the transition metal salt (D), they can be mixed simultaneously. Alternatively, the thermoplastic resin (B), the compatibilizer (C) and the transition metal salt (D) can be mixed, and then the mixture can be mixed with the gas barrier resin (A). Alternatively, the thermoplastic resin (B) and the compatibilizer (C) can be mixed, and then the mixture can be mixed with the gas barrier resin (A) and the transition metal salt (D). The gas barrier resin (A) and the transition metal salt (D) can be mixed, and then the mixture can be mixed with the thermoplastic resin (B) and the compatibilizer (C). Furthermore, the gas barrier resin (A), the thermoplastic resin (B) and the compatibilizer (C) can be mixed, and then the mixture can be mixed with the transition metal salt (D). Alternatively, the compatibilizer (C) and the transition metal salt (D) can be mixed, and then the mixture can be mixed with the gas barrier resin (A) and the thermoplastic resin (B). Moreover, the mixture obtained by mixing the gas barrier resin (A), the thermoplastic resin (B) and the compatibilizer (C) can be mixed with the mixture obtained by mixing the gas barrier resin (A) and the transition metal salt (D).

As a specific method of mixing, melt-kneading is preferable because of the simplified process and the cost. In this case, it is preferable to use an apparatus with high kneading ability to allow the components to be finely and uniformly dispersed, because this can provide good oxygen absorption performance and good transparency, and can prevent gels and aggregates from being generated or mixed.

As the apparatus having a high kneading level, continuous kneaders such as a continuous intensive mixer and a kneading type twin screw extruder (co-rotation or counter-rotation), a mixing roll, and a Ko-kneader; batch kneaders such as a high-speed mixer, a Banbury mixer, an intensive mixer, or a pressure kneader; an apparatus using a rotary disk having a trituration mechanism such as a stone mill, for example, the KCK Kneading Extruder from KCK Co., Ltd.; a single screw extruder provided with a kneading section (e.g., Dulmage and CTM); and a simple kneader such as a ribbon blender and a Brabender mixer can be used. Among the above, continuous kneaders are preferable. Examples of available continuous intensive mixers include FCM from Farrel Corp., CIM from The Japan Steel Works, Ltd., and KCM, LCM, and ACM from Kobe Steel, Ltd. It is preferable to use an apparatus equipped with a single screw extruder underneath such a kneader to perform kneading and extrusion pelletizing simultaneously. Also as a twin screw kneading extruder equipped with a kneading disk or a kneading rotor, for example, TEX from Japan Steel Works, Ltd., ZSK from Werner & Pfleiderer Corp., TEM from Toshiba Machine Co., Ltd., and PCM from Ikegai Tekko Co, Ltd. can be used.

In these continuous kneaders, the shape of the rotor or disk plays a key role. In particular, the gap between the mixing chamber and the rotor chip or the disk chip (chip clearance) is important. Being too narrow or too wide fails to provide a mixture with a good dispersibility. The optimal chip clearance is in the range of 1 to 5 mm.

The rotational speed of the rotor of the kneader is generally 100 to 1200 rpm, preferably 150 to 1000 rpm, and more preferably 200 to 800 rpm. The inner diameter (D) of the chamber of the kneader is, for example, 30 mm or more, preferably in the range of 50 to 400 mm. The ratio (L/D) of the length (L) to the inner diameter (D) of the chamber of the kneader is preferably 4 to 30. A single kneader may be used, or two or more kneaders may be coupled for use.

The kneading temperature is generally in the range of 50 to 300° C. It is preferable to perform extrusion at low temperatures with the hopper port sealed with nitrogen in order to prevent oxidation of the thermoplastic resin (B). A longer kneading period provides better results. However, considering the prevention of oxidation of the thermoplastic resin (B) and the production efficiency, the kneading time is generally 10 to 600 seconds, preferably 15 to 200 seconds, even more preferably 15 to 150 seconds.

The resin composition of the present invention can be molded into various molded articles such as films, sheets, containers or other packaging materials by using various molding methods as appropriate. In this case, the resin composition of the present invention can be subjected to molding after being formed into pellets, or the components of the resin composition can be subjected directly to molding after being dry-blended.

With respect to molding methods and molded articles, for example, the resin composition of the present invention can be molded into films, sheets, pipes and the like by melt extrusion molding, into containers by injection molding and into bottle-like hollow containers by blow molding. As the blow molding, it is preferable to employ extrusion blow molding where a parison is formed by extrusion molding and blown for obtaining a molded article, and injection blow molding where a preform is formed by injection molding and blown for obtaining a molded article.

(Multilayered Structure and Multilayered Container)

In the present invention, the molded article produced by the above-described molding methods may be composed of a single layer, but it is preferable that the molded article is in the form of a multilayered structure obtained by laminating a layer of the resin composition of the present invention and other layers, in view of providing characteristics such as mechanical properties, water vapor barrier properties, and further oxygen barrier properties.

Examples of a layer structure of the multilayered structure includes x/y, x/y/x, x/z/y, x/z/y/z/x, x/y/x/y/x, and x/z/y/z/x/z/y/z/x, where x denotes a layer made of a resin other than the resin composition of the present invention, y denotes the resin composition layer of the present invention, and z denotes an adhesive resin layer, but the structure is not limited to these structures. In the case where a plurality of x layers are provided, such layers may be made of the same kind of resin or of different kinds of resin. A recovered resin layer made of scraps generated by trimming during molding may be additionally formed, or such recovered resin may be blended in a layer made of another resin. The thickness of the layers of the multilayered structure is not limited to a particular thickness. However, the ratio of the thickness of the y layer to the total thickness of all the layers is preferably 2 to 20%, in view of the moldability, the cost or the like.

A thermoplastic resin is preferable as a resin used for the x layer in view of the processability or the like. Examples of such a thermoplastic resin include, but are not limited to, the following resins: polyolefins such as polyethylene, polypropylene, ethylene-propylene copolymer, a copolymer including ethylene or propylene (e.g., a copolymer including ethylene or propylene and at least one of the following monomers as a copolymer component: α-olefins such as 1-butene, isobutene, 4-methyl-1-pentene, 1-hexene, and 1-octene; unsaturated carboxylic acids such as itaconic acid, methacrylic acid, acrylic acid, and maleic anhydride, and their salts, their partial or complete esters, their nitriles, their amides, and their anhydrides; carboxylic acid vinylesters such as vinyl formate, vinyl acetate, vinyl propionate, vinyl butylate, vinyl octanoate, vinyl dodecanoate, vinyl stearate, and vinyl arachidonate; vinylsilane compounds such as vinyltrimethoxysilane; unsaturated sulfonic acids and their salts; alkylthiols; vinyl pyrrolidones and the like), poly-4-methyl-1-pentene and poly-1-butene; polyesters such as polyethylene terephthalate, polybutylene terephthalate, and polyethylene naphthalate; polyamides such as poly e-caprolactam, polyhexamethylene adipamide, and poly-metaxylylene adipamide; polyvinylidene chloride, polyvinyl chloride, polystyrene, polyacrylonitrile, polycarbonate, and polyacrylate. Such a thermoplastic resin layer may be a non-oriented layer or a layer subjected to uniaxial or biaxial drawing or rolling.

Among these thermoplastic resins, polyolefins are preferable because of their excellent moisture-resistance, mechanical properties, economy, heat sealing properties and the like. Polyesters are preferable because of excellent mechanical properties, heat resistance or the like.

On the other hand, there is no limitation regarding the adhesive resin used for the z layer, and any adhesive resin can be used, as long as it can bind the layers to each other. However, preferably used are polyurethane or polyester one-component or two-component curing adhesives, and carboxylic acid-modified polyolefin resin. The carboxylic acid-modified polyolefin resin is an olefin polymer or copolymer containing an unsaturated carboxylic acid or an anhydride thereof (e.g., maleic anhydride) as a copolymer component; or a graft copolymer obtained by grafting an unsaturated carboxylic acid or anhydride thereof to an olefin polymer or a copolymer.

Among these, a carboxylic acid-modified polyolefin resin is more preferable. In particular, when the x layer is a polyolefin resin, the adhesion with the y layer is good. Examples of such a carboxylic acid-modified polyolefin resin include a resin obtained by carboxylic acid modification of polyethylene (low density polyethylene (LDPE), linear low density polyethylene (LLDPE), or very low density polyethylene (VLDPE)), polypropylene, polypropylene copolymer, an ethylene-vinyl acetate copolymer, and ethylene-(meth)acrylate (for example, methyl acrylate or ethyl acrylate) copolymers.

Examples of the method for producing the multilayered structure include, but are not limited to, extrusion lamination, dry lamination, coinjection molding and coextrusion molding. Examples of the coextrusion molding includes coextrusion lamination, coextrusion sheet molding, coextrusion inflation process, and coextrusion blow molding.

The sheet, film, parison and the like of the thus obtained multilayered structure may further be reheated at a temperature below the melting point of the contained resin and stretched uniaxially or biaxially by thermoforming such as draw forming, rolling, pantographic drawing, inflation drawing or blow molding, so that stretched molded products can be obtained.

The resin composition of the present invention exhibits good transparency by selecting an appropriate resin. Therefore, a packaging container whose content is clearly visible can be provided by selecting resins having good transparency as the other resins to be laminated. In view of these aspects, it is preferable that the haze of the multilayered structure having a layer of the resin composition of the present invention is 10% or less, more preferably 5% or less, and even more preferably 3% or less.

The molded articles using the multilayered structure can be used in various applications. In particular, when the multilayered structure is used as multilayered containers, the advantages provided by the multilayered structure are significantly prominent. Furthermore, layers having high water vapor barrier properties are provided on both sides or on the highly humid side of the resin composition layer of the present invention is preferable in that the retention period of the oxygen scavenging function is particularly prolonged, and as a result, very high gas barrier properties can be retained for a long time. On the other hand, the multilayered container having the resin composition layer as the innermost layer (innermost side of the container) is preferable in that the oxygen scavenging function in the container can be exerted promptly.

Furthermore, the resin composition of the present invention exhibits good transparency by selecting an appropriate resin. Thus, such a composition is suitable for a packaging container whose content is clearly visible. Among such packaging containers, the following two embodiments of packaging containers have a strict requirement for transparency and thus particularly receive a benefit from the resin composition of the present invention. One embodiment is a container composed of a multilayered film having a total thickness of 300 μm or less and including a layer made of the resin composition of the present invention. The other embodiment is a multilayered container including at least one layer made of the resin composition of the present invention and at least one thermoplastic polyester (PES) layer. These containers will be described below in this order.

The container composed of a multilayered film having a total thickness of 300 μm or less and including a layer made of the resin composition of the present invention is a flexible container composed of a multilayered structure having a relatively small total thickness and generally is processed into the form of a pouch or the like. This container has excellent gas barrier properties, and further has a continuous oxygen scavenging function, and the production is simple, so that this container is very useful for packaging of a product that is highly sensitive to oxygen and susceptible to degradation.

In general, for a container that requires good transparency, each of the resin layers constituting the multilayered structure is thin so that a thin container as a whole can be produced. For example, in the case where crystalline resin such as polyolefin is used, if the thickness is large, the transparency tends to be poor due to scattering in the crystal. On the other hand, if the thickness of the container is small, good transparency can be obtained. In general, a non-oriented crystallized resin exhibits poor transparency, whereas an oriented crystallized resin exhibits good transparency. Such a uniaxially or biaxially oriented film is generally thin. Also from this point of view, a thin multilayered structure tends to exhibit good transparency.

The resin composition of the present invention exhibits good transparency by selecting an appropriate resin. Therefore, the resin composition of the present invention can be used suitably as a container composed of a thin multilayered film for which transparency is often required. Even though the transparency of such a thin film deteriorates over time, the extent of the deterioration is small. The thickness of such a multilayered film is not limited to a particular thickness, but is preferably 300 μm or less, more preferably 250 μm or less, and even more preferably 200 μm or less, to retain the good transparency and flexibility. The total thickness of all layers is preferably 10 μm or more, more preferably 20 μm or more, and even more preferably 30 μm or more, in view of the mechanical strength as a container.

When producing the multilayered container with a multilayered film, there is no particular limitations regarding the method for producing the multilayered film. For example, a multilayered film can be formed by laminating a layer of the resin composition of the present invention and a layer of another thermoplastic resin by techniques such as dry lamination or coextrusion lamination.

In the case of dry lamination, non-oriented films, uniaxially oriented films, biaxially oriented films, and rolled films can be used. Among these, a biaxially oriented polypropylene film, a biaxially oriented polyethylene terephthalate film and a biaxially oriented poly ε-caprolactam film are suitable because of their mechanical strength. The biaxially oriented polypropylene film is particularly preferable also in view of good moisture-resistance. When non-oriented films or uniaxially oriented films are used, the laminated film may further be re-heated and stretched uniaxially or biaxially by thermoforming such as draw forming, rolling, pantographic drawing, or inflation drawing, so that an oriented multilayered film can be formed.

In order to seal the obtained multilayered container, it is preferable to form a layer made of a heat-sealable resin on at least one outermost layer surface of the multilayered film in the process of producing the multilayered film. Polyolefin such as polyethylene and polypropylene may be used as such a heat-sealable resin.

The thus obtained multilayered film can be processed into, for example, a bag shape and thus a packaging container to be filled with a material is obtained. Such a packaging container is flexible and convenient, and has good transparency and oxygen scavenging properties, so that it is significantly useful for packaging of materials that are susceptible to degradation by the presence of oxygen, especially for foods or the like.

The multilayered container including at least one layer made of the resin composition of the present invention and at least one layer made of the PES layer has good gas barrier properties, and excellent oxygen scavenging function. Furthermore, good transparency can be provided by selecting an appropriate resin. Therefore, the multilayered container is used in various forms such as a bag-shaped container, a cup-shaped container, or a hollow molded container. Among these, the hollow molded container, especially a bottle, is important.

Bottles made of PES are broadly used as containers for drinks at present. For this use, such bottles are required to prevent the contents from degrading and it is required that the contents, i.e., a drink, is clearly visible by the consumer. Moreover, when oxygen-sensitive drinks such as beer that easily degrade in flavor are to be filled, the bottles are required to have significantly high gas barrier properties and oxygen scavenging performance.

The multilayered container containing at least one layer of the resin composition of the present invention and at least one PES layer is most suitable for the above use because of its advantages of keeping the quality of the content from degrading as well as retaining the transparency. Regarding the layer structure of the multilayered container, an adhesive resin layer may be provided between the resin composition layer and the PES layer. However, the multilayered container in which the PES layers are in direct contact with both surfaces of the resin composition layer is particularly preferable because the following advantages of the present invention can be provided to a sufficient extent: higher transparency can be achieved, and the resistance to impact delamination between the resin composition layer and the PES layer is excellent.

As the PES used for the multilayered container of the present invention including the layer made of the thermoplastic resin composition of the present invention and the PES layer, condensation polymers including aromatic dicarboxylic acids or alkyl esters thereof and diols as main components are used. In particular, PES including ethylene terephthalate as the main component is preferable in attaining the purpose of the present invention. More specifically, the total proportion (mol %) of a terephthalic acid unit and an ethylene glycol unit is preferably 70 mol % or more, and more preferably 90 mol % or more, of the total moles of all the structural units of the PES. If the total proportion of the terephthalic acid unit and the ethylene glycol unit is less than 70 mol %, the resultant PES is amorphous, so that the mechanical strength is insufficient. In addition, when the PES is stretched and formed into a container and the contents are hot-filled in the container, the thermal contraction is so large that it may not be put in practical use.

Moreover, when solid-phase polymerization is carried out to reduce oligomers contained in the resin, the softened resin tends to stick, which makes production difficult.

If necessary, the above PES may contain a bifunctional compound unit other than the terephthalic acid unit and the ethylene glycol unit within the range in which the above-described problems are not caused. The proportion (mol %) thereof is preferably 30 mol % or less, more preferably 20 mol % or less, and even more preferably 10 mol % or less, of the total moles of all the structural units of the PES. Examples of such a bifunctional compound unit include a dicarboxylic acid unit, a diol unit, and a hydroxycarboxylic acid unit. Such bifunctional compound units may either be aliphatic, alicyclic, or aromatic bifunctional compound units. Specific examples thereof include a neopentyl glycol unit, a cyclohexanedimethanol unit, a cyclohexanedicarboxylic acid unit, an isophthalic acid unit, and a naphthalenedicarboxylic acid unit.

Among these, an isophthalic acid unit is advantageous since the resultant PES provides a broad range of conditions under which good products can be produced and provides good moldability. This results in a lowered defective production rate. This is also advantageous in that it suppresses the crystallization rate, so that the molded article is prevented from whitening. Also preferable are a 1,4-cyclohexanedimethanol unit and 1,4-cyclohexanedicarboxylic acid unit because the resultant molded article has even better strength against dropping. Naphthalene dicarboxylic acid unit is also preferable in that the resultant PES has a high glass transition temperature and thus, the thermal resistance is improved, and the ability of absorbing ultraviolet radiation can be provided. This is especially useful when the content is susceptible to degradation by ultraviolet radiation. For example, this is particularly useful when the content is susceptible to degradation by both oxidation and ultraviolet radiation, such as beer.

In the case of using a polycondensation catalyst during the production of the PES, a catalyst generally used for production of PES may be used. Examples thereof include: antimony compounds such as antimony trioxide; germanium compounds such as germanium dioxide, germanium tetraethoxide, and germanium tetra-n-butoxide; titanium compounds such as titanium tetramethoxide, titanium tetraethoxide, titanium tetra-n-propoxide, titanium tetraisopropoxide, and titanium tetrabutoxide; and tin compounds such as di-n-butyltin dilaurate, di-n-butyltin oxide, and dibutyltin diacetate. These catalysts may be used alone or in combination of two or more. The amount of the polycondensation catalyst used is preferably 0.002 to 0.8 wt % based on the weight of the dicarboxylic acid.

Among these, antimony compounds are preferable in view of the cost of the catalyst, and antimony trioxide is especially preferable. On the other hand, germanium compounds are preferable in that the resultant PES has a good color tone, and germanium dioxide is especially preferable. In view of moldability, the germanium compounds are more preferable than the antimony compounds. The PES obtained by the polymerization reaction using an antimony compound as a catalyst has a higher crystallization rate than the case using a germanium compound as a catalyst. This means that in the case of using an antimony compound, crystallization tends to proceed easily by heating during injection molding or blow molding. The resultant bottles are likely to generate whitening and may be poor in transparency. The degree of orientation by drawing may also be lowered, and an intended shape for molded bottles may not be obtained. This narrows the range of conditions under which good products can be produced, which tends to increase the rate of production of defective products.

In particular, when polyethylene terephthalate containing no copolymer component except for diethylene glycol as a by-product is used as the PES used for the present invention, it is preferable to use a germanium compound as the catalyst to suppress the crystallization rate when producing the PES.

The method for producing a multilayered container of the present invention including at least one layer made of the resin composition and at least one PES layer is not specifically defined, but coinjection blow molding is preferred in view of productivity. In coinjection blow molding, the container is produced by subjecting a multilayered container precursor (parison) obtained by coinjection molding to stretch blow molding.

In the coinjection molding, in general, the resins to constitute the layers of the multilayered structure are guided to a concentric nozzles from two or more injection cylinders and are injected into a single mold simultaneously or alternately at non-synchronized timings, and one clamping operation is performed for molding. For example, parisons are produced by, but not limited to, the following methods: (1) PES layers for the inner and outer layers are first injected, then the resin composition for the sandwiched layer is injected, and thus a molded container of a three-layered structure of PES/resin composition/PES is obtained; and (2) PES layers for the inner and outer layers are first injected, then the resin composition is injected, and the PES layer is injected again simultaneously with the injection of the resin composition or thereafter so that a molded container of a five-layered structure of PES/resin composition/PES/resin composition/PES is obtained. Moreover, an adhesive resin layer may be disposed between the resin composition layer and the PES layer in the above layered structures, if necessary.

Regarding the conditions for injection molding, the PES is preferably injected at a temperature in the range of 250 to 330° C., more preferably 270 to 320° C., even more preferably 280 to 310° C. If the injection temperature for PES is lower than 250° C., the PES is not sufficiently melted, and the resulting molded articles may have non-molten substances (fisheyes), worsening the appearance, and moreover, causing the degradation of the mechanical strength of the molded articles. In some extreme cases, the screw torque for the PES injection may increase, whereby the molding machine may have operational malfunctions. If the injection temperature for PES exceeds 330° C., PES may be highly decomposed, which may lead to a lowered molecular weight, so that the mechanical strength of the molded articles may be lowered. Moreover, the PES decomposition gives off some vapors of acetaldehyde and the like, and thus the properties of the materials to be filled in the molded articles may be worsened. Moreover, the oligomers resulting from the PES decomposition may contaminate the mold significantly, and the resultant molded articles may have a poor appearance.

The thermoplastic resin composition is preferably injected at a temperature in the range of 170 to 250° C., more preferably 180 to 240° C., and even more preferably 190 to 230° C. If the injection temperature for the resin composition is lower than 170° C., the resin composition is not sufficiently melted, and the resulting molded articles may have non-molten substances (fisheyes), and thus their appearance may be worsened. In some extreme cases, the screw torque for the injection of the resin composition may increase, so that the molding machine may have operational malfunctions. On the other hand, if the injection temperature for the resin composition exceeds 250° C., oxidation of the thermoplastic resin (B) may proceed, so that the gas barrier properties and the oxygen scavenging function of the resin composition may be degraded. In addition, the molded articles may be unfavorably colored and contain gelled materials, so that the appearance of the resulting molded articles may be poor. Moreover, the flow of the resin composition being injected will be disordered or blocked by vapors generated through decomposition of the resin composition and by the gelled materials, so that the layer of the resin composition may have failed areas. In some extreme cases, the gelled materials may make it impossible to continue the injection molding operation. In order to suppress the progress of the oxidation of the composition during melting, it is preferable to seal the supply hopper with nitrogen.

The resin composition of the present invention may be first formed into pellets by melt-blending raw material components, and then the pellets may be supplied to the molding machine. Alternatively, the components may be dry-blended, and then the dry blend may be fed to the molding machine.

The temperature of the hot runner parts through which PES and the resin composition run to be injected into the mold is preferably in the range of 220 to 300° C., more preferably 240 to 280° C., even more preferably 250 to 270° C. If the temperature of the hot runner parts is lower than 220° C., PES crystallizes and solidifies in the hot runner parts. If so, the molding operation will become difficult. If the temperature of the hot runner parts exceeds 300° C., oxidation of the thermoplastic resin (B) proceeds so that the gas barrier properties and the oxygen scavenging function of the resin composition may be degraded. In addition, the molded articles may be unfavorably colored and contain gelled materials, so that the appearance of the resulting molded articles may be poor. Moreover, the flow of the resin composition being injected may be disordered or blocked by vapors generated through decomposition of the resin composition and by the gelled materials. Thus, the layer of the resin composition may have defective areas. In some extreme cases, the gelled materials may make it impossible to continue the injection molding operation.

It is preferable that the mold temperature is in the range of 0 to 70° C., more preferably 5 to 50° C., even more preferably 10 to 30° C. With this, the crystallization of the PES and the resin composition in the parisons can be suppressed and they are uniformly stretched. Therefore, molded articles having improved delamination resistance, transparency, and good shape retentivity can be obtained. If the mold temperature is lower than 0° C., the dew formed around the mold may worsen the appearance of the parisons, and thus good molded articles may not be obtained. If the mold temperature exceeds 70° C., the crystallization of PES and the resin composition may not be suppressed. As a result, the parisons may fail to be uniformly stretched, and the resistance to delamination between the layers and the transparency of the resultant molded articles are degraded, and it is difficult to obtain molded articles of the intended shape.

The total thickness of the thus obtained parison is preferably in the range of 2 to 5 mm, and the total thickness of the thermoplastic resin composition layer or layers is preferably in the range of 10 to 500 $\mu$m in total.

The parison is directly in its high-temperature state, or after having been re-heated with heating means such as a block heater, an infrared heater, or the like, transferred to the next stretch blowing stage. In the stretch blowing stage, the heated parison is stretched one- to five-fold in the machine direction, and thereafter blown one- to four-fold with compressed air or the like so that the injection-blown molded multilayered container of the present invention can be produced. The temperature of the parison is preferably in the range of 75 to 150° C., more preferably 85 to 140° C., even more preferably 90 to 130° C., and most preferably 95 to 120° C. If the temperature of the parison exceeds 150° C., the PES easily crystallizes, so that the resultant container is whitened and its appearance may become poor. In addition, the delamination of the stretch-blown container will increase unfavorably. On the other hand, if the temperature of the parison is less than 75° C., the PES may be crazed to be pearly, so that the transparency of the resulting container may be lost.

The total thickness of the body part of the thus obtained multilayered container of the present invention generally is in the range of 100 to 2000 $\mu$M, preferably 150 to 1000 $\mu$m, and may vary depending on the use of the container. In this case, the total thickness of the resin composition layer is preferably in the range of 2 to 200 $\mu$m, more preferably 5 to 100 $\mu$m.

Thus, the multilayered containers including the layer made of the resin composition of the present invention and the PES layer are obtained. The containers may have good transparency and also have excellent gas barrier properties and oxygen scavenging function. The containers are therefore suitable for packaging materials susceptible to degradation in the presence of oxygen, such as foods and medicines. Especially, they can be used most suitably as containers for drinks such as beer.

Furthermore, the resin composition of the present invention is suitable for use in a packing (gasket) used in containers, especially, as a gasket used for caps of containers. In this case, there is no particular limitations regarding the material of the cap body, and materials that are used generally in the art, for example, a thermoplastic resin and a metal can be used. The cap including such a gasket, in which the gasket is mounted on the cap body, has excellent gas barrier properties and also has a lasting oxygen scavenging function, so that this cap is very useful for the purpose of packaging a product that is highly sensitive to oxygen and susceptible to degradation.

EXAMPLE

Hereinafter, the present invention will be described by way of examples, but is not limited thereto.

In the examples, analysis was performed as follows.
(1) Ethylene Content and the Degree of Saponification of EVOH:

The ethylene content and the degree of saponification of EVOH were calculated based on the spectrum obtained by $^1$H-NMR (nuclear magnetic resonance) measured using a deuterated dimethyl sulfoxide as a solvent ( "JNM-GX-500 Model" manufactured by JEOL Ltd. was used for measurement).

(2) Content of Phosphoric Acid Radicals in EVOH:First, 10 g of dry sample tips were put into 50 ml of 0.01N hydrochloric acid, and the mixture was stirred at 95° C. for 6 hours. The resultant aqueous solution was quantitatively analyzed by ion chromatography to determine the phosphoric acid radical content as the content of phosphoric acid ions ($PO_4^{3-}$). As the column of the chromatography, CIS-A23 manufactured by Yokogawa Electric Corp. was used. As the eluent, an aqueous solution containing 2.5 mM sodium carbonate and 1.0 mM sodium hydrogencarbonate was used. The quantification was based on the calibration curve prepared by using aqueous solutions of phosphoric acid.

(3) Contents of Sodium Salt, Potassium Salt, and Magnesium Salt in EVOH:

First, 10 g of sample dry chips were put into 50 ml of 0.01N hydrochloric acid, and the mixture was stirred at 95° C. for 6 hours. The resultant aqueous solution was quantitatively analyzed through ion chromatography to determine the sodium salt, potassium salt, and magnesium salt contents as the respective cation contents in terms of the metal. As the column of the chromatography, ICS-C25 manufactured by Yokogawa Electric Corp. was used. As the eluent, an aqueous solution containing 5.0 mM tartaric acid and 1.0 mM 2,6-pyridinedicarboxylic acid was used. The quantification was based on the calibration curves of aqueous solutions of sodium chloride, potassium chloride, and magnesium chloride, respectively.

(4) Oxygen Transmission Rate of EVOH:

The EVOH pellets were extrusion-molded at an extrusion temperature of 210° C. into a film having a thickness of 20 μm. This film was heat-treated at a temperature that is 20° C. lower than the melting point of the EVOH for 10 minutes, and then the oxygen transmission rate was measured with this film at an adjusted temperature and humidity of 20° C. and 65% RH using an oxygen transmission amount measurement device (OX-TRAN-10/50A manufactured by Modem Control Corp.). When a blend of two kinds of EVOH was used as the EVOH, pellets of the two kinds of EVOH were first dry-blended to produce a film according to the above-described method, heating the film, and then the oxygen transmission rate was measured. When the blend of EVOH includes two kinds of EVOH and has two melting points, the heating was performed at a temperature that is 20° C. lower than the temperature of the higher melting point.

(5) Number Average Molecular Weight of Copolymer and Number Average Molecular Weight of Styrene Block of the Copolymer:

The number average molecular weight of a copolymer was obtained in terms of polystyrene using gel permeation chromatography (GPC). The number average molecular weight of the styrene block in the copolymer was obtained in terms of polystyrene using GPC as well. Specifically, this molecular weight is obtained by measuring an intermediate that was sampled after polymerization of styrene for forming a first styrene block by GPC.

(6) Styrene Content of Copolymer, Ratio of Structural Unit Represented by Formula (I) in the Isoprene Block and Content of Carbon—Carbon Double Bonds:

All of these were calculated based on $^1$H-NMR (nuclear magnetic resonance) spectrum measured using a deuterated chloroform as a solvent ("JNM-GX-500 Model" manufactured by JEOL Ltd. was used for measurement). Herein, "styrene content" refers to the ratio (mol %) of styrene units to the total monomer units constituting the copolymer. The "ratio of structural unit represented by formula (I) in the isoprene block" refers to the ratio (%) of the structural unit represented by formula (I) (3,4-isoprene unit and 1,2-isoprene unit) to the total structural units derived from isoprene (1,4-isoprene unit, 3,4-isoprene unit, and 1,2-isoprene unit). Further, based on these results, the content of carbon—carbon double bonds was calculated as the molar amount (eq/g) of the double bonds contained in 1 g of the resin.

(7) Tan δ primary dispersion peak temperature of copolymer:

A sample resin was subjected to film extrusion molding at an extrusion temperature of 210° C. so that a non-oriented film having a thickness of 20 μm was obtained. A test piece having a width of 5 mm was cut out from this film and the measurement was carried out using DVE RHEOSPECTOLER DVE-V4 (manufactured by RHEOLOGY Co., LTD) at a frequency of 11 Hz, a displacement amplitude of 10 μg/m, an inter-chuck distance of 20 mm, a measurement temperature of −150 to 150° C. and a heating rate of 3° C./min. Based on an obtained chart, the tan δ primary dispersion peak temperature derived from the isoprene block in the copolymer was obtained.

(8) Melt Flow Rate:

Sample resin or resin composition chips were put into a cylinder having an inner diameter of 9.55 mm and a length of 162 mm of a melt indexer, L244 (manufactured by Takara Industry), and were molten therein at 210° C. A load was uniformly applied to the molten resin with a plunger having a weight of 2160 g and a diameter of 9.48 mm, by which the resin was extruded out of the cylinder through an orifice at its center having a diameter of 2.1 mm. The amount of the resin or the resin composition extruded per unit time (g/10 min) was measured, and determined as a melt flow rate.

(9) Refractive Index:

Sample resin chips were subjected to film extrusion molding at an extrusion temperature of 210° C. so that a non-oriented film having a thickness of 20 μm was obtained. The refractive index of this film was measured using an Abbe refractometer (4T Model manufactured by Atago Co., Ltd., SL-Na-1 Lamp manufactured by Toshiba Corp.).

(10) Haze Value:

Sample resin or resin composition chips were subjected to film extrusion molding at an extrusion temperature of 210° C. so that a non-oriented film having a thickness of 20 μm was obtained. The haze value of this film was measured using a Poic integrating-sphere light transmittance/complete light reflectance meter (HR-100 Model manufactured by Murakami Color Technology Laboratories) according to ASTM D1003-61. Multilayered films were also subjected to the above measurement. As for multilayered bottles, the body of the bottle was divided into four portions along the circumference at its center. The internal haze values of the respective four portions were measured and averaged to determine the resulting mean value as the haze value of the bottle.

(11) Contents of Structural Units of PET:

The contents of respective structural units of PET were calculated based on $^1$H-NMR (nuclear magnetic resonance) spectrum measured using deuterated trifluoroacetic acid as a solvent ("JNM-GX-500 Model" manufactured by JEOL Ltd. was used for measurement).

(12) Intrinsic Viscosity of PET:

A sample film layer was taken out of the PET layer of the body part of a multilayered container and dissolved in a 1/1 (by weight) mixed solvent of phenol and tetrachloroethane. The viscosity of the resultant solution was measured at 30° C. using an Ubbelohde's viscometer (HRK-3 Model from Hayashi Seisakusho).

(13) Melting Point and Glass Transition Temperature of PET:

A sample film layer was taken out of the PET layer of the body part of a multilayered container, and the measurement was carried out according to JIS K7121 using a differential scanning calorimeter (DSC) RDC220/SSC5200H Model (manufactured by Seiko Electronics Industry). Specifically, the sample was kept at 280° C. for 5 minutes, cooled to 30° C. at a cooling rate of 100° C./min, kept at the temperature for 5 minutes, and then heated at a heating rate of 10° C./min. For temperature calibration, indium and lead were used. The melting peak temperature (Tpm) and the midway glass transition temperature (Tmg) according to JIS K7121 were obtained from the resultant chart, and determined as the melting point and the glass transition temperature, respectively.

(Resins Used in the Examples and the Comparative Examples)

In the examples and the comparative examples, EVOH was used as gas barrier resin (A). The following table shows the properties of the EVOHs used in the examples.

TABLE 2

| EVOH | Ethylene content mol % | Degree of saponification % | MFR g/10 min*[1] | Content of phosphoric acid radicals ppm | Content of sodium salt ppm*[2] | Content of potassium salt ppm*[2] | Content of magnesium salt ppm*[2] | Refractive index | Haze value % | Melting point °C. | Oxygen transmission rate ml · 20 μm/m² · day · atm |
|---|---|---|---|---|---|---|---|---|---|---|---|
| A-11 | 44 | 99.5 | 13.3 | 95 | 85 | 50 | 45 | 1.528 | 1.0 | 165 | 1.5 |
| A-12 | 32 | 99.5 | 10.0 | 100 | 100 | 90 | 45 | 1.533 | 0.8 | 183 | 0.4 |
| A-13 | 32 | 99.5 | 8.4 | 100 | 20 | 60 | 20 | 1.533 | 0.7 | 183 | 0.4 |
| A-21 | 44 | 96.5 | 12.2 | 85 | 70 | 33 | 25 | 1.528 | 0.5 | 152 | 3.0 |

*[1]210° C., 2160 g load
*[2]in terms of metal

The triblock copolymer (B-1) prepared by the following method was used as the thermoplastic resin (B).

First, 600 parts by volume of cyclohexane, 0.16 parts by volume of N, N, N', N'-tetramethylethylenediamine (TMEDA) and 0.094 parts by volume of n-butyl lithium as an initiator were placed in an autoclave equipped with a stirrer and purged with dry nitrogen. The temperature was raised to 50° C., and 4.25 parts by volume of styrene monomer was fed thereto and polymerization was carried out for 1.5 hours. Next, the temperature was reduced to 30° C., and 120 parts by volume of isoprene was fed thereto and polymerization was carried out for 2.5 hours. Furthermore, the temperature was raised again to 50° C., and 4.25 parts by volume of styrene monomer was fed thereto, and polymerization was carried out for 1.5 hours.

Then, 2-tert-butyl-6-(3-tert-butyl-2-hydroxy-5-methylbenzyl)-4-methylphenyl acrylate, and pentaerythritoltetrakis(3-laurylthiopropionate) as antioxidants were added to the resultant reaction mixture in an amount of 0.15 parts by weight each with respect to 100 parts by weight of the total amount of styrene and isoprene. The reaction mixture was poured to methanol to precipitate a product, which was separated and dried. Thus, a triblock copolymer (B-1) to which the antioxidants were added was obtained.

The number average molecular weight of the thus obtained styrene-isoprene-styrene triblock copolymer (B-1) was 85000. The molecular weight of each styrene block in the copolymer was 8500. The styrene content was 14 mol %. The ratio of the structural unit represented by formula (I) in the isoprene block was 55%. The content of carbon—carbon double bonds in the copolymer was 0.014 eq/g, and the melt flow rate (210° C., 2160 g load) was 7.7 g/10 min. The copolymer (B-1) contained 0.12 wt % of 2-tert-butyl-6-(3-tert-butyl-2-hydroxy-5-methylbenzyl)-4-methylphenyl acrylate and 0.12 wt % of pentaerythritoltetrakis(3-laurylthiopropionate). The refractive index of this copolymer (B-1) was 1.531, its haze value was 1.0%, and its tan δ primary dispersion peak temperature derived from the isoprene block was −3° C.

The polymers shown in the following table were used as the compatibilizer (C).

TABLE 3

| Compatibilizer | Polymer | Functional group contained in compatibilizer |
|---|---|---|
| C-1 | Styrene-hydrogenated butadiene-styrene triblock copolymer having a boron-containing polar group | Boronic acid 1,3-butanediol ester group |
| C-2 | Styrene-hydrogenated butadiene-styrene triblock copolymer having a boron-containing polar group | Boronic acid 1,3-butanediol ester group |
| C-3 | Etylene-methacrylic acid copolymer | Carboxyl group |

The compatibilizer (C-1) was prepared as follows.

First, 500 parts by weight of styrene-hydrogenated butadiene-styrene triblock copolymer (TUFTEC (registered trademark) H1062 manufactured by Asahi Chemical Industry Co., Ltd.) and 1500 parts by weight of decalin were placed in a reaction vessel provided with a stirrer, a nitrogen inlet tube, a condenser and a distillation column, and the reaction vessel was purged with nitrogen. Thereafter, the temperature was set to 130° C., and the mixture was stirred to dissolve the copolymer. Further, a mixture of 57.5 parts by weight of a borane-triethyl amine complex and 143 parts by weight of boric acid 1,3-butanediol ester was added to the reaction vessel. After stirring for five minutes, the stirring was stopped temporarily, and the temperature in the reaction vessel was increased to 200° C. After a while, the whole mixture was gelated, and then the formed gel started to be liquified gradually from the wall side. At the time when stirring was possible, the mixture was stirred again, and the stirring was further continued for one hour after the gel was liquified completely in the reaction vessel. The condenser was switched to the distillation column, and the temperature in the reaction vessel was increased to 220° C., and distillation was conducted at normal pressure, and continued until no more distillate occurred. The resultant reaction mixture was cooled, and poured into acetone to precipitate a product, which was separated, and dried under vacuum at 120° C. for one night, and thus a triblock copolymer (C-1) was obtained. This copolymer was dissolved in a mixed solvent of deuterated paraxylene, deuterated chloroform, and ethylene glycol in a ratio of 8:2:0.02, and subjected to ¹H-NMR measurement (500 MHz). The amount of the boronic acid 1,3-butanediol ester group in the copolymer was 220 μeq/g.

The compatibilizer (C-2) was prepared as follows.

First, styrene-hydrogenated butadiene-styrene triblock copolymer was fed to a twin screw extruder at a rate of 7 kg/hour while purging the feeding port with nitrogen at a rate of 1 L/min. The triblock copolymer had the following characteristics: weight average molecular weight=100400; styrene/hydrogenated butadiene =18/82 (weight ratio); 1,2-bond/1,4-bond molar ratio in the butadiene units =47/53; hydrogenation ratio of the butadiene unit =97%, amount of double bond =430 μeq/g, melt index =5 g/10 minutes (230°

C., 2160 g load); density =0.89 g/cm$^3$. Then, a mixed liquid of borane-triethylamine complex (TEAB) and boric acid 1,3-butanediol ester (BBD)(a weight ratio of TEAB/BBD= 29/71) was supplied from a liquid feeder 1 at a rate of 0.6 kg/hour, and 1,3-butanediol was supplied from a liquid feeder 2 at a rate of 0.4 kg/hour, and continuously kneaded. During the kneading, the pressure was regulated such that the gauges at vent 1 and vent 2 indicated about 20 mmHg. As a result, a triblock copolymer (C-2) containing a boronic acid 1,3-butanediol ester group (BBDE) was obtained at a rate of 7 kg/hour from the discharge port. The amount of the boronic acid 1,3-butanediol ester group in the copolymer was 210 µeq/g.

The structure of the twin screw extruder used for the reaction and the operation conditions are as follows.

Co-rotation twin screw extruder TEM-35B (manufactured by Toshiba Machine Co. Ltd.)

| Screw diameter | 37 mm φ |
|---|---|
| L/D | 52 (15 blocks) |
| Liquid feeder | C3 (liquid feeder 1), C11 (liquid feeder 2) |
| Vent position | C6 (vent 1), C14 (vent 2) |
| Screw configuration | Seal rings are used between C5 and C6, between C10 and C11 and at a position C12 |
| Temperature setting | C1 water-cooling |
|  | C2 to C3 200° C. |
|  | C4 to C15 250° C. |
|  | Die 250° C. |
| Screw rotational speed | 400 rpm |

As the compatibilizer (C-3), ethylene-methacrylic acid copolymer ("Nucrel (product name)" N-1207C, manufactured by Du Pont-Mitsui Polychemicals Co., Ltd) was used.

As the thermoplastic polyester, polyethylene terephthalate (PET) obtained by polymerization using germanium dioxide as a catalyst was used. The contents of terephthalic acid unit, ethylene glycol unit and diethylene glycol unit in this PET were 50.0 mol %, 48.9 mol %, and 1.1 mol %, respectively. The intrinsic viscosity was 0.83 dl/g, and the melting point and the glass transition temperature were 252° C. and 800° C., respectively.

Example 1

First, 71.4 parts by weight of the triblock copolymer (B-1), 28.6 parts by weight of the compatibilizer (C-1) and 3.0300 parts by weight of cobalt (II) stearate (0.2857 parts by weight in terms of cobalt atoms) were dry-blended. The blend was extruded into pellets with a 30 mm φ twin screw extruder (TEX-30° S.S-30 CRW-2V, manufactured by Japan Steel Works, Ltd.) at 200° C., a screw rotational speed of 300 rpm, and an extruded resin amount of 25 kg/hour, while purging the cylinder with nitrogen. These pellets were dried at 30° C. under reduced pressure for 8 hours to give resin composition pellets comprising the triblock copolymer (B-1), the compatibilizer (C-1) and cobalt stearate.

The obtained resin composition pellets were extrusion-molded at an extrusion temperature of 210° C. into a film having a thickness of 20 µm (a first single layer film). The haze value of the film was 1.8%. Then, 0.9 m$^2$ (0.2 m×4.5 m; a surface area of 1.8 m$^2$) of this film was rolled 5 hours after the film was formed and put in a conical flask with an internal volume of 375 ml filled with air of 20° C. and 65% RH. The air in the conical flask contained oxygen and nitrogen in a ratio by volume of 21:79. The opening of the conical flask was sealed with a multilayered sheet including an aluminum layer with an epoxy resin, and then the flask was allowed to stand at 20° C. The air inside was sampled with a syringe 2 days, 4 days and 8 days after the sealing, and the oxygen concentration in this air was measured with gas chromatography. The small hole formed through the multilayered sheet was sealed with an epoxy resin every time the hole was formed. The oxygen decrease amount (oxygen absorption amount) was calculated based on the volume ratio of oxygen and nitrogen obtained by the measurement, and then the results shown in FIG. 1 were obtained. The oxygen absorption rate of the film calculated from the measurement results after 2 days and after 8 days was 67 ml/m$^2$·day.

Then, 93 parts by weight of the EVOH (A-11) shown in Table 2 and 7.2121 parts by weight of the above resin composition were dry-blended. The blend was extruded into pellets with a 30 mm φ twin screw extruder (TEX-30SS-30CRW-2V, manufactured by Japan Steel Works, Ltd.) at 210° C., a screw rotational speed of 300 rpm, and an extruded resin amount of 25 kg/hour. These pellets were dried at 30° C. under reduced pressure for 16 hours to give resin composition pellets. The melt flow rate (210° C., 2160 g load) of the resin composition was 13.1 g/10 min. Observation of the cutting plane of the resin composition pellets through an electron microscope confirmed that the triblock copolymer (B-1) was dispersed in the form of a particle having a size of about 1 µm or less in the matrix of the EVOH.

Figure 2:
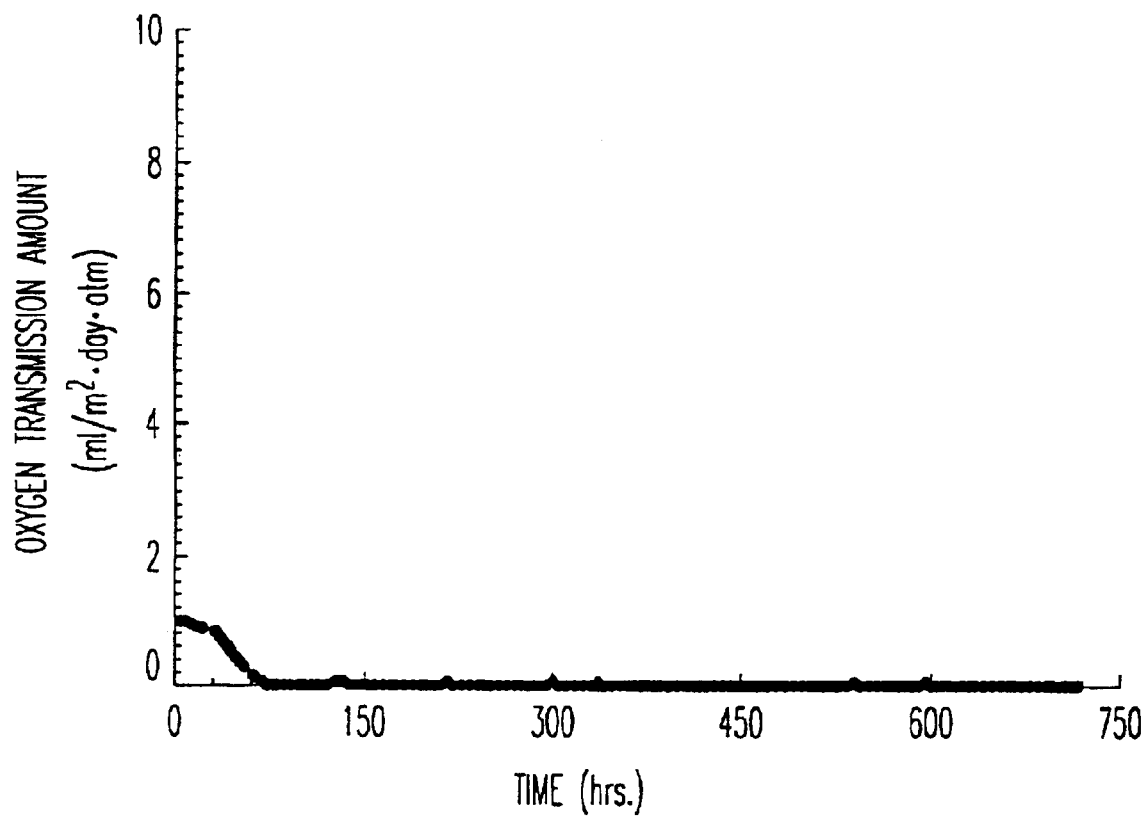
FIG. 2 is a graph in which the oxygen absorption amount of each of the single layer films obtained in Examples 1 to 4 and Comparative Examples 1 to 4 is plotted with respect to time. For Example 1, the graph shows the results of the second single layer film.

A film having a thickness of 20 µm (a second single layer film) was obtained from this resin composition in the same manner as described above. The haze value was measured and found to be 1.3%. When the oxygen absorption amount was measured, the results shown in FIG. 2 were obtained. The oxygen absorption rate of the film was 1.238 ml/m$^2$·day.

Figure 3:
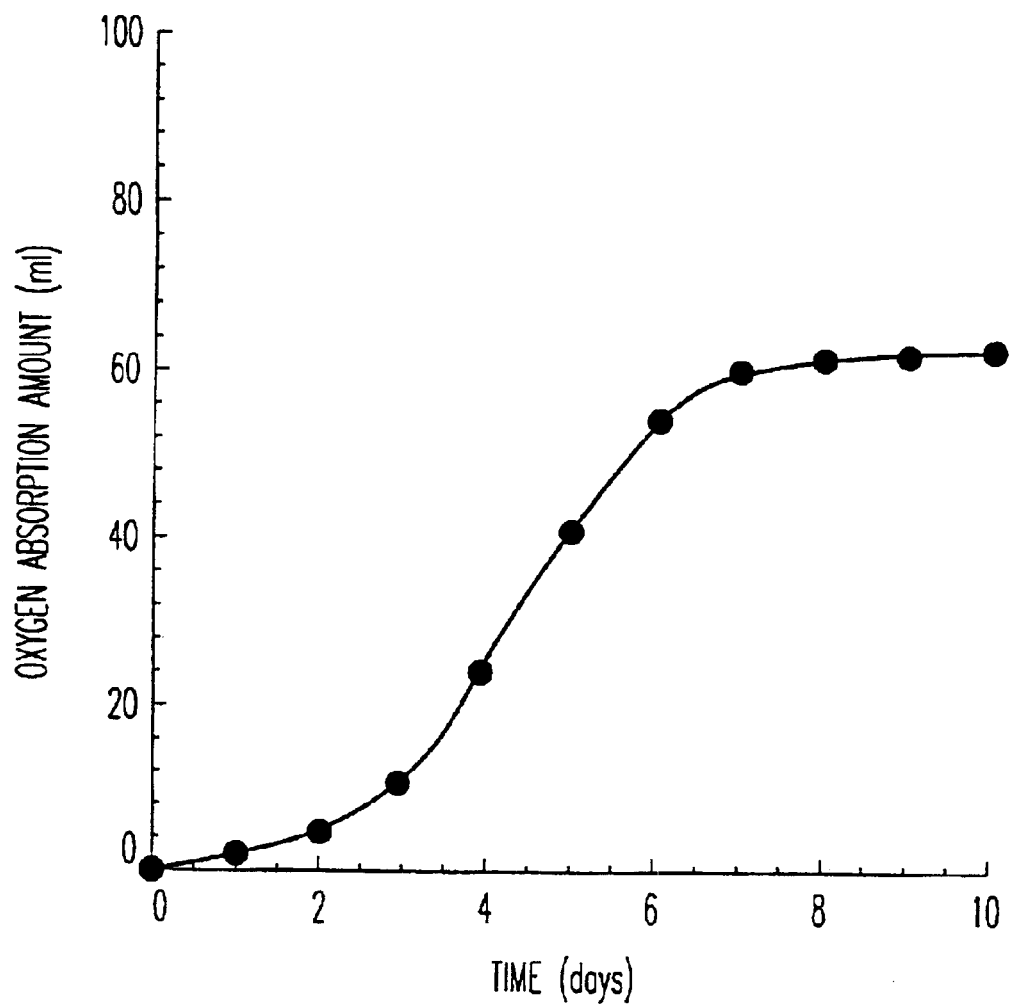
FIG. 3 is a graph in which the oxygen transmission rate of each of the multilayered films obtained in Examples 1 to 4 and Comparative Examples 1 to 4 is plotted with respect to time.

Next, oriented polypropylene films each having a thickness of 20 µm (OP-#20 U-1 from Tohcello Co., Ltd.) were laminated on both surfaces of the obtained film with a toluene/methyl ethyl ketone mixed solution (weight ratio of 1:1) of an urethane adhesive (AD335A from Toyo Morton Ltd.) and a curing agent (Cat-10 from Toyo Morton Ltd.) to obtain a multilayered film. The haze value of this multilayered film was 2.7%. The oxygen transmission rate was measured with this multilayered film at an adjusted temperature and humidity of 20° C. and 85% RH for 1000 hours starting from the point of time of 24 hours after the film formation, using an oxygen transmission amount measurement device (OX-TRAN-10/50A manufactured by Modern Control Corp.). Then, the results shown in FIG. 3 were obtained.

Next, using the resin composition pellets and the above-described PET as raw materials and using a coinjection stretch blow molding machine (ASB-50HT Model manufactured by Nissei ASB, 500 ml), a three-layered parison comprising two kinds of resin of PET/resin composition/PET was obtained. The temperature of the PET injector was 290° C. The temperature of the resin composition injector was 205° C. The temperature of the hot runner block portion in which the PET and the resin composition were combined was 255° C. The temperature of the injection mold core was 15° C., and the temperature of the injection mold cavity was 15° C. The cycle time was 40 seconds. Thereafter, using a stretch blow molding machine (LBO1) manufactured by CORPOPLAST GmbH & Co., the parison was heated to 105° C. at its surface, and subjected to stretch blow molding to obtain a three-layered coinjection blow-molded bottle composed of two kinds of resin, in which the bottom of the bottle was champagne bottle-shaped. In the body part of the bottle, the mean thickness of the inner PET layer, the intermediate layer of the resin composition and the outer PET layer were 100 μm, 15 μm and 150 μm, respectively. The haze value of this bottle was 3.0%.

The temperature and the humidity of the obtained bottle were adjusted to 20° C. and 65% RH for the outside of the bottle and 20° C. and 100% RH for the inside thereof. Using an oxygen transmission amount measurement device (OX-TRAN-10/50A manufactured by Modern Control Corp.), the oxygen transmission rate per container 10 days after the molding was measured and the result was 0.00 ml/container·day·atm.

Separately, water was filled in the bottle as the content, and the bottle was airtightly closed under atmospheric pressure. This bottle with its body in the vertical direction was spontaneously dropped only one time from a height of 50 cm to a horizontal concrete plate with the bottom of the bottle facing downward. For one kind of bottle, 100 bottles were tested, and the delamination incidence rate Rd (%) was calculated from the following equation with the number of bottles Nd in which delamination occurred. The result was 7%.

$$Rd=(Nd/100) \times 100$$

Example 2

First, 71.4 parts by weight of the triblock copolymer (B-1) used in Example 1 and 28.6 parts by weight of the compatibilizer (C-1) were dry-blended. The blend was extruded into pellets at 200° C. with a 30 mm φ twin screw extruder (TEX-30SS-30CRW-2V, manufactured by Japan Steel Works, Ltd.) at a screw rotational speed of 300 rpm and an extruded resin amount of 25 kg/hour while purging the cylinder with nitrogen. These pellets were dried at 30° C. under reduced pressure for 8 hours to give resin composition pellets composed of the triblock copolymer (B-1) and the compatibilizer (C-1).

A film having a thickness of 20 μm was obtained from this resin composition in the same manner as in Example 1. The haze value was measured and found to be 1.6%.

A resin composition was obtained in the same manner as in Example 1, using 74.4 parts by weight of the EVOH (A-11) used in Example 1, 18.6 parts by weight of the EVOH (A-21) shown in Table 2, 7 parts by weight of the resin composition comprising the triblock copolymer (B-1) and the compatibilizer (C-1) described above, and 0.2121 parts by weight of cobalt (II) stearate (0.0200 parts by weight in terms of cobalt atoms). The melt flow rate (210° C., 2160 g load) of this resin composition was 12.8 g/10 min. Observation of the cutting plane of the resin composition pellets through an electron microscope confirmed that the triblock copolymer (B-1) was dispersed in the form of a particle having a size of about 1 μm or less in the matrix of the EVOH.

A film having a thickness of 20 μm was obtained from this resin composition in the same manner as in Example 1. The haze value was measured and found to be 1.2%. When the oxygen absorption amount was measured, the results shown in FIG. 2 were obtained. The oxygen absorption rate of the film was 1.475 ml/m² day. Then, a multilayered film was obtained in the same manner as in Example 1, and the haze value was measured and found to be 2.5%. When the oxygen transmission rate was measured over time, the results shown in FIG. 3 were obtained.

Furthermore, a bottle was obtained in the same manner as in Example 1. The haze value was measured and found to be 2.8%. When the oxygen transmission rate of this bottle was measured in the same manner as in Example 1, the result was 0.00 ml/container·day·atm. When the dropping test was conducted in the same manner as in Example 1, the delamination incidence rate was 1%.

Example 3

A resin composition was obtained in the same manner as in Example 2 except that the EVOH (A-12) shown in Table 2 was used instead of the EVOH (A-11). The melt flow rate (210° C., 2160 g load) of this resin composition was 9.2 g/10 min. Observation of the cutting plane of the resin composition pellets through an electron microscope confirmed that the triblock copolymer (B-1) was dispersed in the form of a particle having a size of about 1 μm or less in the matrix of the EVOH.

A film having a thickness of 20 μm was obtained from this resin composition in the same manner as in Example 1. The haze value was measured and found to be 1.4%. When the oxygen absorption amount was measured, the results shown in FIG. 2 were obtained. The oxygen absorption rate of the film was 0.938 ml/m² ·day. Next a multilayered film was produced in the same manner as in Example 1. The haze value was measured and found to be 2.7%. When the oxygen transmission rate was measured over time, the results shown in FIG. 3 were obtained.

Furthermore, a bottle was obtained in the same manner as in Example 1. The haze value was measured and found to be 2.9%. When the oxygen transmission rate of this bottle was measured in the same manner as in Example 1, the result was 0.00 ml/container·day ·atm. When the dropping test was conducted in the same manner as in Example 1, the delamination incidence rate was 3%.

Example 4

A resin composition was obtained in the same manner as in Example 3 except that the compatibilizer (C-2) was used instead of the compatibilizer (C-1). The melt flow rate (210° C., 2160 g load) of this resin composition was 9.2 g/10 min. Observation of the cutting plane of the resin composition pellets through an electron microscope confirmed that the triblock copolymer (B-1) was dispersed in the form of a particle having a size of about 1 μm or less in the matrix of the EVOH.

A film having a thickness of 20 μm was obtained from this resin composition in the same manner as in Example 1. The haze value was measured and found to be 1.4%. When the oxygen absorption amount was measured, the results shown in FIG. 2 were obtained. The oxygen absorption rate of the film was 1.044 ml/m² day. Next a multilayered film was produced in the same manner as in Example 1. The haze value was measured and found to be 2.8%. When the oxygen transmission rate was measured over time, the results shown in FIG. 3 were obtained.

Furthermore, a bottle was obtained in the same manner as in Example 1. The haze value was measured and found to be 3.0%. When the oxygen transmission rate of this bottle was measured in the same manner as in Example 1, the result was 0.00 ml/container·day·atm. When the dropping test was conducted in the same manner as in Example 1, the delamination incidence rate was 2%.

Example 5

First, 94 parts by weight of the EVOH (A-13) shown in Table 2, 5 parts by weight of the triblock copolymer (B-1), 1 part by weight of the compatibilizer (C-3) and 0.2121 parts by weight of cobalt (II) stearate (0.0200 parts by weight in terms of the cobalt atoms) were used to obtain a resin composition in the same manner as in Example 1. The melt flow rate (210° C., 2160 g load) of this resin composition was 9.4 g/10 min. Observation of the cutting plane of the resin composition pellets through an electron microscope confirmed that the triblock copolymer (B-1) was dispersed in the form of a particle having a size of about 1 μm in the matrix of the EVOH.

In order to evaluate the thermal stability of the resin composition, an apparatus for differential thermogravimetric analysis (TG/DTA220 Model and SSC5200H Model manufactured by Seiko Electronics Industry) was used. The resin composition pellets were heated from room temperature to 260° C. at a heating rate of 10° C./min in a nitrogen atmosphere and kept at 260° C. for 2 hours. The weight retaining ratio of the pellets (the weight ratio of the pellets based on the weight before heating) was 98.5%.

Figure 4:
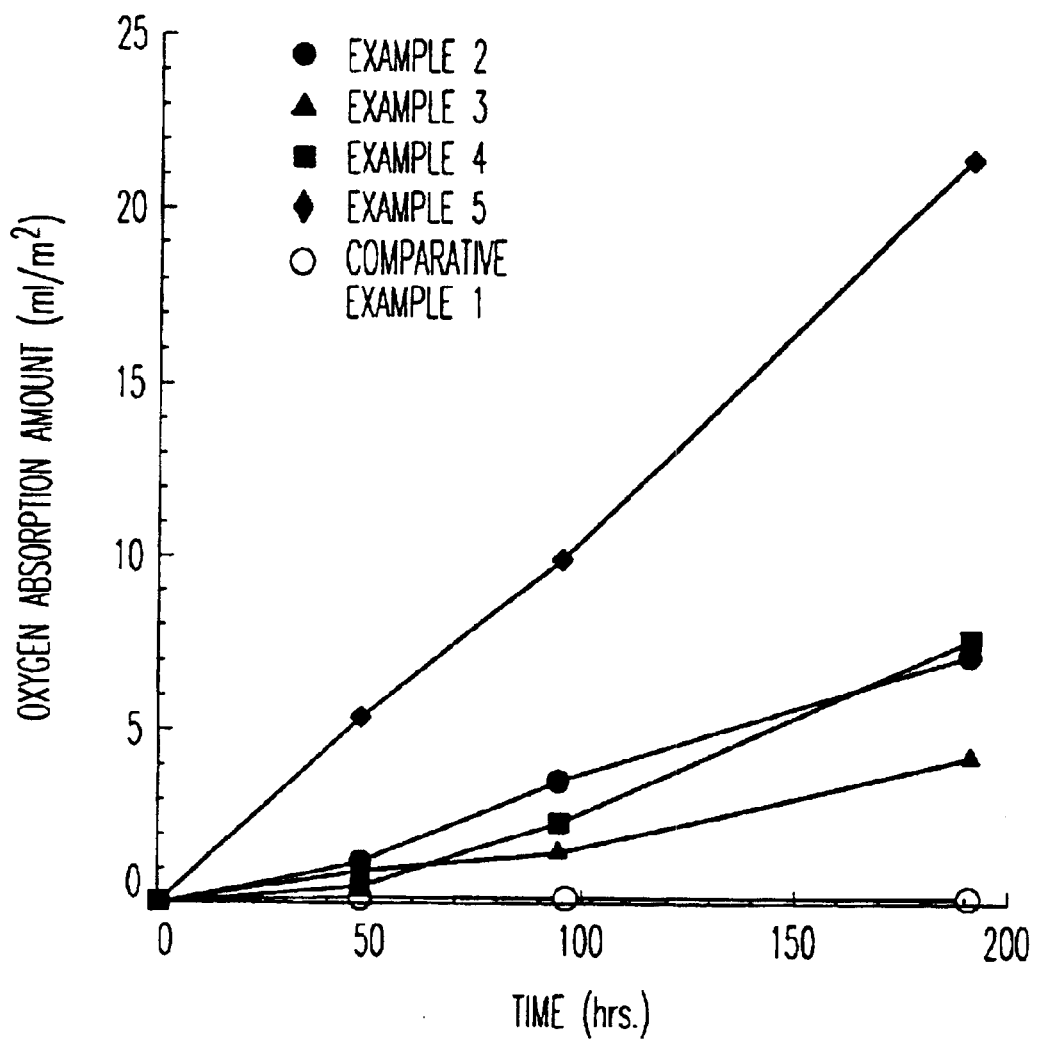
FIG. 4 is a graph in which the oxygen absorption amount of each of the single layer films obtained in Examples 5 to 7 and Comparative Examples 5 and 6 is plotted with respect to time.
Figure 5:
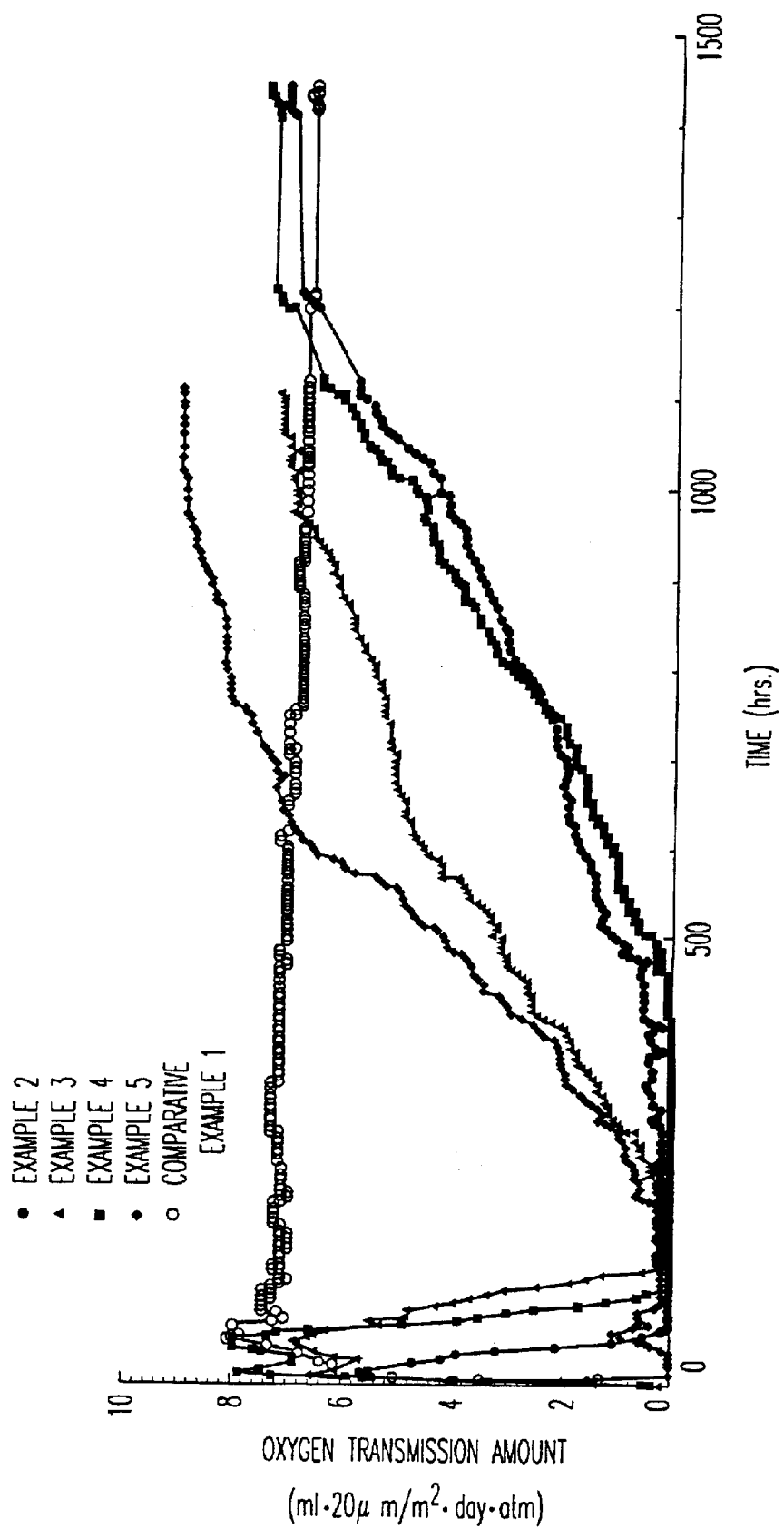
FIG. 5 is a graph in which the oxygen transmission rate of each of the multilayered films obtained in Example 5 and Comparative Examples 5 and 6 is plotted with respect to time.
Figure 6:
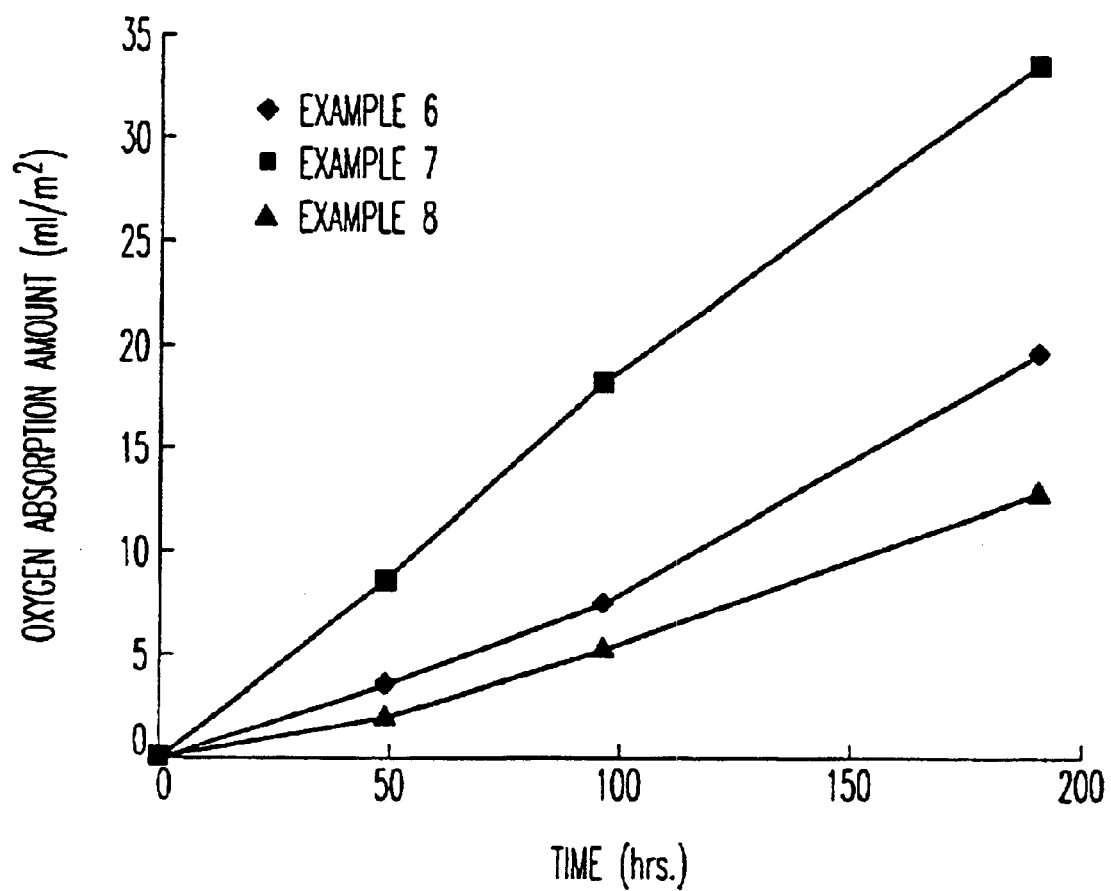

A film having a thickness of 20 μm was obtained from this resin composition in the same manner as in Example 1. The haze value was measured and found to be 1.1%. When the oxygen absorption amount was measured in the same manner as in Example 1 except that the sampling was performed 2 days, 6 days and 13 days after the sealing, the results shown in FIG. 4 were obtained. The oxygen absorption rate of the film obtained from the measurement results of day 2 and day 13 was 0.525 ml/m²·day. Next, a multilayered film was obtained in the same manner as in Example 1. The haze value was measured and found to be 2.4%. When the oxygen transmission rate was measured over time, the results shown in FIG. 5 were obtained.

Next, using the resin composition pellets and the above-described PET as raw materials and using a coinjection stretch blow molding machine (ASB-50HT Model manufactured by Nissei ASB, for two moldings of 750 ml each), a three-layered parison comprising two kinds of resin of PET/resin composition/PET was obtained. The temperature of the PET injector was 290° C. The temperature of the resin composition injector was 220° C. The temperature of the hot runner block portion in which the PET and the resin composition were combined was 260° C. The temperature of the injection mold core was 15° C., and the temperature of the injection mold cavity was 15° C. The cycle time was 40 seconds. Thereafter, using a stretch blow molding machine (LB01) manufactured by CORPOPLAST GmbH & Co., the parison was heated to 105° C. at its surface, and subjected to stretch blow molding to obtain a three-layered coinjection blow-molded bottle composed of two kinds of resin. In the body part of the bottle, the mean thickness of the inner PET layer, the intermediate layer of the resin composition and the outer PET layer were 200 μm, 20 μm and 70 μm, respectively. The haze value of this bottle was 2.9%.

The temperature and the humidity of the obtained bottle were adjusted to 20° C. and 65% RH for the outside of the bottle and 20° C. and 100% RH for the inside thereof. Using an oxygen transmission amount measurement device (OX-TRAN-10/50A manufactured by Modern Control Corp.), the oxygen transmission rate per container 10 days after the molding was measured and the result was 0.00 ml/container·day·atm. Moreover, the bottle was stored for three months with its outside being kept at 20° C. and 65% RH in a nitrogen atmosphere and its inside at 20° C. and 100% RH in a nitrogen atmosphere and the oxygen transmission rate per container was measured and found to be 0.00 ml/container·day·atm.

Furthermore, the above-described bottles were produced continuously and the appearance of the bottles produced after 12 hours of continuous operation were observed visually. Defective appearances such as air bubbles were not found at all.

Example 6

First, 100 parts by weight of the compatibilizer (C-3) and 3 parts by weight of cobalt (II) acetate (1 part by weight in terms of cobalt atoms) were dry-blended. The blend was melt-kneaded for 5 minutes at 220° C. in a nitrogen atmosphere and a screw rotational speed of 60 rpm using "Labo Plastomill" (manufactured by Toyo Seiki Seisaku-Sho, Ltd.) equipped with a Brabender. Neutralization reaction started immediately after the raw materials were introduced and acetic acid vapor was generated as a by-product. However, the generation of the vapor was stopped at the end of the kneading. Thus, 101 parts by weight of a deep blue colored compatibilizer composition was obtained.

Then, 93 parts by weight of the EVOH (A-13) used in Example 5, 5 parts by weight of the triblock copolymer (B-1) and 2.02 parts by weight of the above-described compatibilizer composition were used to obtain a resin composition in the same manner as in Example 1. The melt flow rate (210° C., 2160 g load) of this resin composition was 9.6 g/10 min. Observation of the cutting plane of the resin composition pellets through an electron microscope confirmed that the triblock copolymer (B-1) was dispersed in the form of a particle having a size of about 1 μm in the matrix of the EVOH. When the thermal stability of the resin composition was evaluated in the same manner as in Example 5, the weight retaining ratio of the pellets was 99.4%.

A film having a thickness of 20 μm was obtained from this resin composition in the same manner as in Example 5. The haze value was measured and found to be 1.6%. When the oxygen absorption amount was measured, the results shown in FIG. 4 were obtained. The oxygen absorption rate of the film was 0.507 ml/m²·day. Next, a multilayered film was obtained in the same manner as in Example 5. The haze value was measured and found to be 2.7%.

Furthermore, a bottle was obtained in the same manner as in Example 5. The haze value was measured and found to be 3.4%. When the oxygen transmission rate of this bottle was measured in the same manner as in Example 5, the result was 0.00 ml/container·day·atm. The oxygen transmission rate of the bottle after three months storage was 0.00 ml/container·day·atm.

Furthermore, the above-described bottles were produced continuously and the appearance of the bottles produced after 12 hours of continuous operation were observed visually. Defective appearances such as air bubbles were not found at all.

Example 7

First, 101 parts by weight of a deep blue colored compatibilizer composition was obtained in the same manner as in Example 6 except that 10.6 parts by weight of cobalt (II) stearate (1 part by weight in terms of cobalt atoms) was used instead of 3 parts by weight of cobalt (II) acetate.

Then, a resin composition was obtained in the same manner as in Example 6 except that the compatibilizer composition was changed into the above-described composition. The melt flow rate (210° C., 2160 g load) of this resin composition was 9.6 g/10 min. Observation of the cutting plane of the resin composition pellets through an electron microscope confirmed that the triblock copolymer (B-1) was dispersed in the form of a particle having a size of about 1 μm in the matrix of the EVOH. When the thermal stability of the resin composition was evaluated in the same manner as in Example 5, the weight retaining ratio of the pellets was 99.3%.

A film having a thickness of 20 μm was obtained from this resin composition in the same manner as in Example 5. The haze value was measured and found to be 1.4%. When the oxygen absorption amount was measured, the results shown in FIG. 4 were obtained. The oxygen absorption rate of the film was 0.471 ml/m²·day. Next, a multilayered film was obtained in the same manner as in Example 5. The haze value was measured and found to be 2.8%.

Furthermore, a bottle was obtained in the same manner as in Example 5. The haze value was measured and found to be 3.2%. When the oxygen transmission rate of this bottle was measured in the same manner as in Example 5, the result was 0.00 ml/container·day·atm. The oxygen transmission rate of the bottle after three months storage was 0.00 ml/container·day·atm.

Furthermore, the above-described bottles were produced continuously and the appearance of the bottles produced after 12 hours of continuous operation were observed visually. Defective appearances such as air bubbles were not found at all.

Comparative Example 1

EVOH (A-11) was used alone to obtain a film having a thickness of 20 m in the same manner as in Example 1. When the oxygen absorption amount was measured, the results shown in FIG. 2 were obtained. The oxygen absorption rate of the film was 0.000 ml/m²·day. Next a multilayered film was produced in the same manner as in Example 1. The haze value was measured and found to be 2.1%. When the oxygen transmission rate was measured over time, the results shown in FIG. 3 were obtained.

Furthermore, a bottle was obtained in the same manner as in Example 1. The haze value was measured and found to be 2.1%. When the oxygen transmission rate of this bottle was measured in the same manner as in Example 1, the result was 0.03 ml/container·day·atm. When the dropping test was conducted in the same manner as in Example 1, the delamination incidence rate was 10%.

Comparative Example 2

First, 95 parts by weight of the EVOH (A-11) used in Example 1, 5 parts by weight of the triblock copolymer (B-1) and 0.2121 parts by weight of cobalt (II) stearate (0.0200 parts by weight in terms of cobalt atoms) were used to obtain a resin composition in the same manner as in Example 1. The melt flow rate (210° C., 2160 g load) of this resin composition was 13.5 g/10 min. Observation of the cutting plane of the resin composition pellets through an electron microscope confirmed that the triblock copolymer (B-1) was dispersed in the form of a particle having a size of about 1 to 2 μm in the matrix of the EVOH.

A film having a thickness of 20 μm was obtained from this resin composition in the same manner as in Example 1. The haze value was measured and found to be 1.5%. When the oxygen absorption amount was measured, the results shown in FIG. 2 were obtained. The oxygen absorption rate of the film was 1.117 ml/m² ·day. Next a multilayered film was produced in the same manner as in Example 1. The haze value was measured and found to be 2.9%. When the oxygen transmission rate was measured over time, the results shown in FIG. 3 were obtained.

Furthermore, a bottle was obtained in the same manner as in Example 1. The haze value was measured and found to be 3.3%. When the oxygen transmission rate of this bottle was measured in the same manner as in Example 1, the result was 0.00 ml/container·day·atm. When the dropping test was conducted in the same manner as in Example 1, the delamination incidence rate was 52%.

Comparative Example 3

A film having a thickness of 20 μm was obtained in the same manner as in Comparative example 1 except that the EVOH (A-12) was used instead of the EVOH (A-11). When the oxygen absorption amount was measured, the results shown in FIG. 2 were obtained. The oxygen absorption rate of the film was 0.000 ml/m² day. Next, a multilayered film was produced in the same manner as in Example 1. The haze value was measured and found to be 2.0%. When the oxygen transmission rate was measured over time, the results shown in FIG. 3 were obtained.

Furthermore, a bottle was obtained in the same manner as in Example 1. The haze value was measured and found to be 2.0%. When the oxygen transmission rate of this bottle was measured in the same manner as in Example 1, the result was 0.02 ml/container·day·atm. When the dropping test was conducted in the same manner as in Example 1, the delamination incidence rate was 11%.

Comparative Example 4

A resin composition was obtained in the same manner as in Comparative Example 2 except that the EVOH (A-12) was used instead of the EVOH (A-11). The melt flow rate (210° C., 2160 g load) of this resin composition was 10.0 g/10 min. Observation of the cutting plane of the resin composition pellets through an electron microscope confirmed that the triblock copolymer (B-1) was dispersed in the form of a particle having a size of about 1 to 2 μm in the matrix of the EVOH.

A film having a thickness of 20 μm was obtained from this resin composition in the same manner as in Example 1. The haze value was measured and found to be 1.4%. When the oxygen absorption amount was measured, the results shown in FIG. 2 were obtained. The oxygen absorption rate of the film was 0.700 ml/m²·day. Next a multilayered film was produced in the same manner as in Example 1. The haze value was measured and found to be 2.9%. When the oxygen transmission rate was measured over time, the results shown in FIG. 3 were obtained.

Furthermore, a bottle was obtained in the same manner as in Example 1. The haze value was measured and found to be 3.4%. When the oxygen transmission rate of this bottle was measured in the same manner as in Example 1, the result was 0.00 ml/container·day·atm. When the dropping test was conducted in the same manner as in Example 1, the delamination incidence rate was 85%.

Comparative Example 5

EVOH (A-13) was used alone. When the thermal stability of the EVOH was evaluated in the same manner as in Example 5, the weight retaining ratio of the EVOH pellets was 91.4%. A film having a thickness of 20 μm was obtained from this resin in the same manner as in Example 5. When the oxygen absorption amount was measured, the results shown in FIG. 4 were obtained. The oxygen absorption rate of the film was 0.000 ml/m²·day. Next a multilayered film was produced in the same manner as in Example 5. The haze value was measured and found to be 2.0%. When the oxygen transmission rate was measured over time, the results shown in FIG. 5 were obtained.

Furthermore, a bottle was obtained in the same manner as in Example 5. The haze value was measured and found to be 2.4%. When the oxygen transmission rate of this bottle was measured in the same manner as in Example 5, the result was 0.02 ml/container day atm. The oxygen transmission rate of the bottle after three months storage was 0.02 ml/container·day·atm.

Furthermore, the above-described bottles were produced continuously and the appearance of the bottles produced after 12 hours of continuous operation were observed visually. Defective appearances such as air bubbles were not found at all.

Comparative Example 6

First, 95 parts by weight of the EVOH (A-13) used in Example 5, 5 parts by weight of the triblock copolymer (B-1) and 0.2121 parts by weight of cobalt (II) stearate (0.0200 parts by weight in terms of cobalt atoms) were used to obtain a resin composition in the same manner as in Example 5. The melt flow rate (210° C., 2160 g load) of this resin composition was 9.5 g/10 min. Observation of the cutting plane of the resin composition pellets through an electron microscope confirmed that the triblock copolymer (B-1) was dispersed in the form of a particle having a size of about 1 $\mu$m in the matrix of the EVOH. When the thermal stability of the resin composition was evaluated in the same manner as in Example 5, the weight retaining ratio of the pellets was 83.0%.

A film having a thickness of 20 $\mu$m was obtained from this resin composition in the same manner as in Example 1. The haze value was measured and found to be 1.0%. When the oxygen absorption amount was measured, the results shown in FIG. 4 were obtained. The oxygen absorption rate of the film was 0.565 ml/m$^2$·day. Next, a multilayered film was produced in the same manner as in Example 1. The haze value was measured and found to be 2.3%. When the oxygen transmission rate was measured over time, the results shown in FIG. 5 were obtained.

Furthermore, a bottle was obtained in the same manner as in Example 5. The haze value was measured and found to be 2.7%. When the oxygen transmission rate of this bottle was measured in the same manner as in Example 5, the result was 0.00 ml/container·day·atm. The oxygen transmission rate of the bottle after three months storage was 0.00 ml/container·day·atm.

Furthermore, production of the above-described bottles was performed continuously. The appearance of the bottles produced after 12 hours of continuous operation were observed visually and a few air bubbles were found.

Components of the above resin compositions are shown collectively in Table 4, and the results of the various evaluation are shown collectively in Tables 5 and 6.

TABLE 4

| Resin composition | EVOH (A) | | | | | | Thermoplastic resin (B) (parts by weight) | Compatibilizer (C) | | Transition metal salt (D) ppm*[3] |
|---|---|---|---|---|---|---|---|---|---|---|
| | EVOH (a1) | parts by weight | EVOH (a2) | parts by weight | Melting point (° C.) | Oxygen transmission rate*[9] | | Compatibilizer | parts by weight | |
| Example 1 | A-11 | 93.0 | — | — | 165 | 1.5 | 5.0 | C-1 | 2.0 | 200 |
| Example 2 | A-11 | 74.4 | A-21 | 18.6 | 162 | 1.7 | 5.0 | C-1 | 2.0 | 200 |
| Example 3 | A-12 | 74.4 | A-21 | 18.6 | 182, 153 | 0.6 | 5.0 | C-1 | 2.0 | 200 |
| Example 4 | A-12 | 74.4 | A-21 | 18.6 | 182. 153 | 0.6 | 5.0 | C-2 | 2.0 | 200 |
| Example 5 | A-13 | 94.0 | — | — | 183 | 0.4 | 5.0 | C-3 | 1.0 | 200 |
| Example 6 | A-13 | 93.0 | — | — | 183 | 0.4 | 5.0 | C-3 | 2.0 | 200 |
| Example 7 | A-13 | 93.0 | — | — | 183 | 0.4 | 5.0 | C-3 | 2.0 | 200 |
| Comparative Example 1 | A-11 | 100.0 | — | — | 165 | 1.5 | — | — | — | — |
| Comparative Example 2 | A-11 | 95.0 | — | — | 165 | 1.5 | 5.0 | — | — | 200 |
| Comparative Example 3 | A-12 | 100.0 | — | — | 183 | 0.4 | — | — | — | — |
| Comparative Example 4 | A-12 | 95.0 | — | — | 183 | 0.4 | 5.0 | — | — | 200 |
| Comparative Example 5 | A-13 | 100.0 | — | — | 183 | 0.4 | — | — | — | — |
| Comparative Example 6 | A-13 | 95.0 | — | — | 183 | 0.4 | 5.0 | — | — | 200 |

*[3]in terms of metal

*[9]ml · 20 $\mu$m/m$^2$ · day · atm

TABLE 5

| | Resin composition | | | Multilayered film | Bottle | | |
|---|---|---|---|---|---|---|---|
| | MFR g/10 min*[4] | Haze value % | Oxygen absorption rate*[5] ml/m²·day | Haze value % | Haze value % | Oxygen transmission rate ml/container·day·atm | Delamination incidence rate % |
| Example 1 | 13.1 | 1.3 | 1.238 | 2.7 | 3.0 | 0.00 | 7 |
| Example 2 | 12.8 | 1.2 | 1.475 | 2.5 | 2.8 | 0.00 | 1 |
| Example 3 | 9.2 | 1.4 | 0.938 | 2.7 | 2.9 | 0.00 | 3 |
| Example 4 | 9.2 | 1.4 | 1.044 | 2.8 | 3.0 | 0.00 | 2 |
| Comparative Example 1 | 13.3 | 1.0 | 0.000 | 2.1 | 2.1 | 0.03 | 10 |
| Comparative Example 2 | 13.5 | 1.5 | 1.117 | 2.9 | 3.3 | 0.00 | 52 |
| Comparative Example 3 | 10.0 | 0.8 | 0.000 | 2.0 | 2.0 | 0.02 | 11 |
| Comparative Example 4 | 10.0 | 1.4 | 0.700 | 2.9 | 3.4 | 0.00 | 85 |

*[4]210° C., 2160 g load
*[5]Calculated from oxygen absorption amounts measured after 2 days and 8 days

TABLE 6

| | Resin composition | | | | Multilayered film | Bottle | | | |
|---|---|---|---|---|---|---|---|---|---|
| | MFR g/10 min*[4] | Haze value % | Oxygen absorption rate*[6] ml/m²·day | Weight retaining ratio % | film Haze value % | Haze value % | Oxygen transmission rate 1*[7] ml/container·day·atm | Oxygen transmission rate 2*[8] ml/container·day·atm | Appearance |
| Example 5 | 9.4 | 1.1 | 0.525 | 98.5 | 2.4 | 2.9 | 0.00 | 0.00 | good |
| Example 6 | 9.6 | 1.6 | 0.507 | 99.4 | 2.7 | 3.4 | 0.00 | 0.00 | good |
| Example 7 | 9.6 | 1.4 | 0.471 | 99.3 | 2.8 | 3.2 | 0.00 | 0.00 | good |
| Comparative Example 5 | 8.4 | 0.7 | 0.000 | 91.4 | 2.0 | 2.4 | 0.02 | 0.02 | good |
| Comparative Example 6 | 9.5 | 1.0 | 0.565 | 83.0 | 2.3 | 2.7 | 0.00 | 0.00 | slighty poor |

*[4]210° C., 2160 g load
*[6]Calculated form oxygen absorption amounts measured after 2 days and 13 days
*[7]Oxygen transmission rate of bottle 10 days after formation
*[8]Oxygen transmission rate of bottle 3 months after formation

Example 8

First, the multilayered film obtained in Example 5 was stamped into a shape of a gasket so as to fit the body of a polypropylene screw cap having an outer diameter of 65 mm and a bottom thickness of 1.2 mm and was attached to the body of this screw cap. Next, the cap body provided with the gasket was supplied in a mold of a compression molding machine for gasket production. Then, ethylene-l-butene copolymer ("POLYBUTYLENE 8240" manufactured by Shell Chemicals Ltd.; a copolymer of 1-butene (99 mol % or more) and ethylene (1 mol % or less) having a density of 0.908 g/cm³ and MFR of 2.0 g/10 min (210° C., 2160 g of load)) was supplied onto the surface of the gasket made of the multilayered film and compression-molded so that a cap having a multilayered gasket was produced. The temperatures of the cylinder, the nozzle and the mold of the compression molding machine were adjusted to be 245° C., 235° C. and 30° C., respectively.

Next, 200 ml of water was supplied to a cylindrical blow bottle made of polyester with an internal volume of 500 ml. The cap obtained above was attached thereto and closed lightly with fingertips. The body was shaken 20 times extensively in the vertical direction with its body part supported by hands and liquid leakage was observed. The liquid leakage was not found at all.

Industrial Applicability

The present invention provides a resin composition having an excellent oxygen scavenging function. This resin composition is easy to handle and can be molded to an arbitrary shape. In particular, a container made of this resin composition not only has good gas barrier properties, moisture-resistance, aroma retentivity, and flavor barrier properties, but also an excellent impact delamination resistance, and good appearance, especially, high transparency. Therefore, the resin composition of the present invention is useful as a container of products that have high sensitivity to oxygen and are easily degraded, in particular, foods, drinks, medicines, cosmetics or the like.

What is claimed is:
1. A resin composition comprising a gas barrier resin (A), a thermoplastic resin (B) other than the gas barrier resin (A) and a compatibilizer (C), wherein
   the gas barrier resin (A) is at least one selected from the group consisting of polyvinyl alcohol resins, polyamides, and polyacrylonitrile,
   the gas barrier resin (A) has an oxygen transmission rate of 500 ml·20 μm/m² ·day·atm (20° C., 65% RH) or less,
   the thermoplastic resin (B) has a carbon-carbon double bond, and an oxygen absorption rate of the resin composition is 0.001 m/m²·day or more.

2. The resin composition of claim 1, further comprising a transition metal salt (D).

3. A resin composition comprising a gas barrier resin (A), a thermoplastic resin (B) other than the gas barrier resin (A), a compatibilizer (C) and a transition metal salt (D), wherein
the gas barrier resin (A) is at least one selected from the group consisting of polyvinyl alcohol resins, polyamides, and polyacrylonitrile,
the gas barrier resin (A) has an oxygen transmission rate of 500 ml·20μm/m$^2$·day·atm (20° C., 65% RH) or less, and
the thermoplastic resin (B) has a carbon-carbon double bond.

4. The resin composition of claim 3, wherein the transition metal salt (D) is contained in a ratio of 1 to 5000 ppm in terms of the metal element, based on a total weight of the gas barrier resin (A), the thermoplastic resin (B) and the compatibilizer (C).

5. The resin composition of claim 3, wherein the transition metal salt (D) comprises at least one transition metal selected from the group consisting of iron, nickel, copper, manganese, and cobalt.

6. The resin composition of claim 3, wherein the thermoplastic resin (B) comprises a carbon—carbon double bond in a ratio of 0.0001 eq/g or more.

7. The resin composition of claim 3, wherein the thermoplastic resin (B) comprises a unit represented by formula (I)

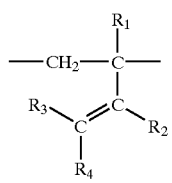

(I)

wherein $R_1$ is a hydrogen atom or an alkyl group having 1 to 5 carbon atoms, $R_2$ is a hydrogen atom, an alkyl group having 1 to 10 carbon atoms, an aryl group, an alkylaryl group, an arylalkyl group or an alkoxy group, $R_3$ and $R_4$ are each independently a hydrogen atom, an alkyl group having 1 to 10 carbon atoms, an aryl group that can be substituted, —COOR$_5$, —OCOR$_6$, a cyano group or a halogen atom, and $R_5$ and $R_6$ are each independently an alkyl group having 1 to 10 carbon atoms, an aryl group, an alkylaryl group, an arylalkyl group or an alkoxy group.

8. The resin composition of claim 3, wherein a number average molecular weight of the thermoplastic resin (B) is 1000 to 500000.

9. The resin composition of claim 3, wherein the gas barrier resin (A) is an ethylene-vinyl alcohol copolymer having an ethylene content of 5 to 60 mol % and a degree of saponification of 90% or more.

10. The resin composition of claim 3, wherein a difference in refractive index between the gas barrier resin (A) and the thermoplastic resin (B) is 0.01 or less.

11. The resin composition of claim 3, wherein particles of the thermoplastic resin (B) are dispersed in a matrix of the gas barrier resin (A).

12. The resin composition of claim 3, comprising 40 to 99.8 wt % of the gas barrier resin (A), 0.1 to 30 wt % of the thermoplastic resin (B) and 0.1 to 30 wt % of the compatibilizer (C).

13. A resin composition comprising a thermoplastic resin (B) and a compatibilizer (C), wherein
the thermoplastic resin (B) comprises a unit represented by formula (I)

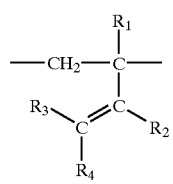

(I)

wherein $R_1$, $R_2$, $R_3$ and $R_4$ are each independently a hydrogen atom or a methyl group,
the structural unit represented by formula (I) is derived from isoprene, and is contained in the thermoplastic resin (B) in an amount of 10 mol % or more,
the thermoplastic resin (B) has a carbon—carbon double bond in a ratio of 0.0001 eq/g or more,
a number average molecular weight of the thermoplastic resin (B) is 1000 to 500000, and
an oxygen absorption rate of the resin composition is 0.1 ml/m$^2$·day or more.

14. The resin composition of claim 13, further comprising a transition metal salt (D).

15. A resin composition comprising a thermoplastic resin (B), a compatibilizer (C) and a transition metal salt (D), wherein
the thermoplastic resin (B) comprises a unit represented by formula (I)

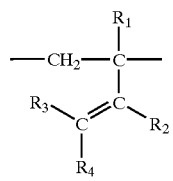

(I)

wherein $R_1$, $R_2$, $R_3$ and $R_4$ are each independently a hydrogen atom or a methyl group,
the structural unit represented by formula (I) is derived from isoprene, and is contained in the thermoplastic resin (B) in an amount of 10 mol % or more,
the thermoplastic resin (B) has a carbon—carbon double bond in a ratio of 0.0001 eq/g or more, and
a number average molecular weight of the thermoplastic resin (B) is 1000 to 500000.

16. The resin composition of claim 15, wherein the transition metal salt (D) is contained in a ratio of 1 to 50000 ppm in terms of the metal element, based on a total weight of the thermoplastic resin (B) and the compatibilizer (C).

17. The resin composition of claim 15, wherein the transition metal salt (D) comprises at least one transition metal selected from the group consisting of iron, nickel, copper, manganese, and cobalt.

18. The resin composition of claim 3, wherein the compatibilizer (C) is a thermoplastic resin having at least one functional group selected from the group consisting of a carboxyl group, a boronic acid group and a boron-containing group that can be converted to a boronic acid group in a presence of water.

19. The resin composition of claim 3, wherein the thermoplastic resin (B) comprises an aromatic vinyl compound unit and a diene compound unit.

20. The resin composition of claim 19, wherein the diene compound unit is at least one of an isoprene unit and a butadiene unit.

21. The resin composition of claim 19, wherein the aromatic vinyl compound unit is a styrene unit.

22. The resin composition of claim 19, wherein the thermoplastic resin (B) is a block copolymer.

23. A multilayered structure comprising at least one layer made of the resin composition of claim 1.

24. A multilayered container comprising at least one layer made of the resin composition of claim 1 and at least one thermoplastic polyester layer.

25. A cap comprising a gasket made of the resin composition of claim 1, wherein the gasket is mounted on a cap body.

26. The resin composition of claim 15, wherein the compatibilizer (C) is a thermoplastic resin having at least one functional group selected from the group consisting of a carboxyl group, a boronic acid group and a boron-containing group that can be converted to a boronic acid group in a presence of water.

27. The resin composition of claim 15, wherein the thermoplastic resin (B) comprises an aromatic vinyl compound unit and a diene compound unit.

28. The resin composition of claim 27, wherein the diene compound unit is at least one of an isoprene unit and a butadiene unit.

29. The resin composition of claim 27, wherein the aromatic vinyl compound unit is a styrene unit.

30. The resin composition of claim 27, wherein the thermoplastic resin (B) is a block copolymer.

31. A multilayered structure comprising at least one layer made of the resin composition of claim 3.

32. A multilayered structure comprising at least one layer made of the resin composition of claim 13.

33. A multilayered structure comprising at least one layer made of the resin composition of claim 15.

34. A multilayered container comprising at least one layer made of the resin composition of claim 3 and at least one thermoplastic polyester layer.

35. A multilayered container comprising at least one layer made of the resin composition of claim 13 and at least one thermoplastic polyester layer.

36. A multilayered container comprising at least one layer made of the resin composition of claim 15 and at least one thermoplastic polyester layer.

37. A cap comprising a gasket made of the resin composition of claim 3, wherein the gasket is mounted on a cap body.

38. A cap comprising a gasket made of the resin composition of claim 13, wherein the gasket is mounted on a cap body.

39. A cap comprising a gasket made of the resin composition of claim 15, wherein the gasket is mounted on a cap body.

* * * * *

UNITED STATES PATENT AND TRADEMARK OFFICE
CERTIFICATE OF CORRECTION

PATENT NO. : 6,822,031 B2
DATED : November 23, 2004
INVENTOR(S) : Tai et al.

It is certified that error appears in the above-identified patent and that said Letters Patent is hereby corrected as shown below:

<u>Title page,</u>
Item [87], PCT, should read as follows:
-- [87] PCT Pub. No.:   WO02/18496
       PCT Pub. Date.:  Mar. 7, 2002 --

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,822,031 B2 |
| APPLICATION NO. | : 10/111912 |
| DATED | : November 23, 2004 |
| INVENTOR(S) | : Shinji Tai et al. |

It is certified that error appears in the above-identified patent and that said Letters Patent is hereby corrected as shown below:

The title page should be deleted and substitute the attached title page.

Delete drawing sheets 1-6 showing figures 1-6, and substitute the attached sheets showing figures 1-5.

(12) United States Patent
Tai et al.

(10) Patent No.: US 6,822,031 B2
(45) Date of Patent: Nov. 23, 2004

(54) RESIN COMPOSITION AND A MULTILAYERED CONTAINER

(75) Inventors: Shinji Tai, Kurashiki (JP); Hiroyuki Shimo, Kurashiki (JP); Masakazu Nakaya, Kurashiki (JP); Kaoru Ikeda, Kurashiki (JP)

(73) Assignee: Kuraray Co., Ltd., Kurashiki (JP)

(*) Notice: Subject to any disclaimer, the term of this patent is extended or adjusted under 35 U.S.C. 154(b) by 182 days.

(21) Appl. No.: 10/111,912

(22) PCT Filed: Aug. 31, 2001

(86) PCT No.: PCT/JP01/07581
§ 371 (c)(1),
(2), (4) Date: May 1, 2002

(87) PCT Pub. No.: WO02/18496
PCT Pub. Date: May 2, 2001

(65) Prior Publication Data
US 2003/0018114 A1 Jan. 23, 2003

(30) Foreign Application Priority Data

Sep. 1, 2000 (JP) ........................ 2000-266184
Sep. 1, 2000 (JP) ........................ 2000-266185

(51) Int. Cl.$^7$ ........................ C08K 5/04; C08F 4/06
(52) U.S. Cl. ........................ 524/398; 526/90; 526/335; 428/35.2; 428/35.8
(58) Field of Search ........................ 524/398; 526/90; 526/335; 428/35.2, 35.8

(56) References Cited

U.S. PATENT DOCUMENTS 5,346,644 A * 9/1994 Speer et al. ........... 252/188.28

FOREIGN PATENT DOCUMENTS

| EP | 1 033 080 | 9/2000 |
|---|---|---|
| EP | 1 067 154 A2 | 1/2001 |
| JP | 4-45144 | 2/1992 |
| JP | 4-211444 | 8/1992 |
| JP | 519616 | 12/1992 |
| JP | 5-156095 | 6/1993 |
| JP | 5-170980 | 7/1993 |
| JP | 5-295171 | 11/1993 |
| JP | 2001-72873 | 3/2001 |
| JP | 2001-106866 | 4/2001 |
| JP | 2001-106920 | 4/2001 |

* cited by examiner

Primary Examiner—Kriellion A. Sanders
(74) Attorney, Agent, or Firm—Oblon, Spivak, McClelland, Maier & Neustadt, P.C.

(57) ABSTRACT

The present invention provides a resin composition having an oxygen scavenging function. The resin composition comprises a gas barrier resin (A), a thermoplastic resin (B) other than the gas barrier resin (A), and a compatibilizer (C), wherein the gas barrier resin (A) has an oxygen transmission rate of 500 ml·20 μm/m$^2$·days·atm (20° C., 65% RH) or less, the thermoplastic resin (B) has a carbon—carbon double bond, and an oxygen absorption rate of the resin composition is 0.001 m/m$^2$·day or more.

39 Claims, 5 Drawing Sheets

UNITED STATES PATENT AND TRADEMARK OFFICE
CERTIFICATE OF CORRECTION

PATENT NO. : 6,822,031 B2
APPLICATION NO. : 10/111912
DATED : November 23, 2004
INVENTOR(S) : Shinji Tai et al.

It is certified that error appears in the above-identified patent and that said Letters Patent is hereby corrected as shown below:

Drawings-

Fig. 1

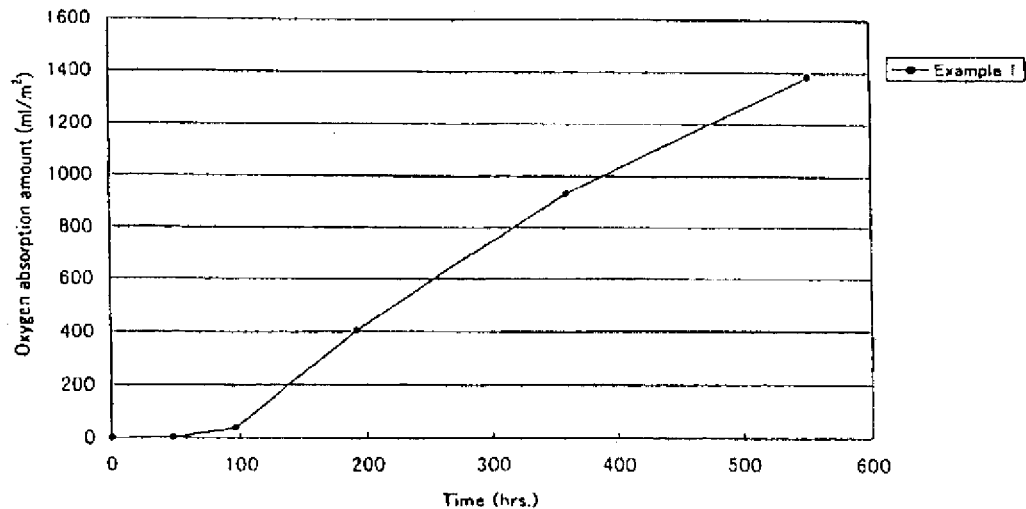

UNITED STATES PATENT AND TRADEMARK OFFICE
CERTIFICATE OF CORRECTION

PATENT NO. : 6,822,031 B2
APPLICATION NO. : 10/111912
DATED : November 23, 2004
INVENTOR(S) : Shinji Tai et al.

It is certified that error appears in the above-identified patent and that said Letters Patent is hereby corrected as shown below:

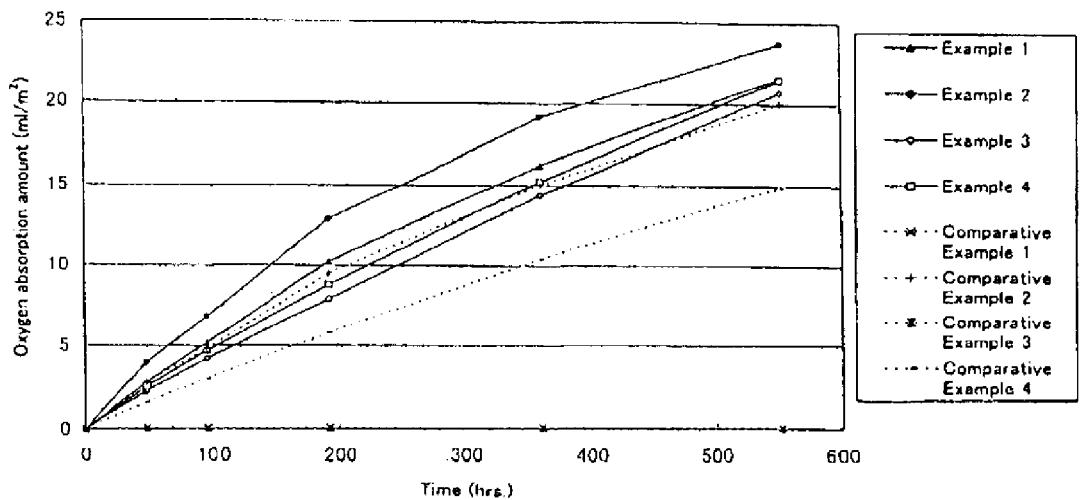

Fig. 2

UNITED STATES PATENT AND TRADEMARK OFFICE
CERTIFICATE OF CORRECTION

PATENT NO. : 6,822,031 B2
APPLICATION NO. : 10/111912
DATED : November 23, 2004
INVENTOR(S) : Shinji Tai et al.

It is certified that error appears in the above-identified patent and that said Letters Patent is hereby corrected as shown below:

Fig. 3

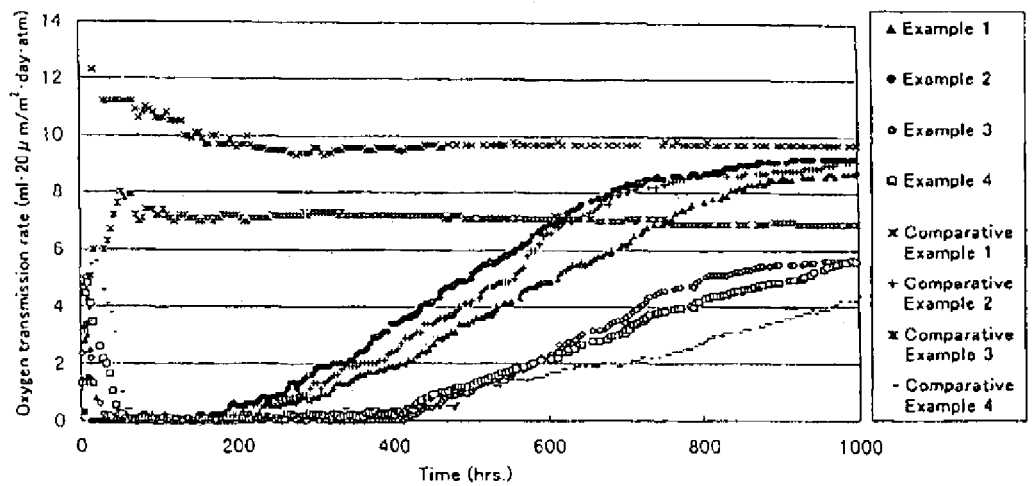

UNITED STATES PATENT AND TRADEMARK OFFICE
CERTIFICATE OF CORRECTION

PATENT NO. : 6,822,031 B2
APPLICATION NO. : 10/111912
DATED : November 23, 2004
INVENTOR(S) : Shinji Tai et al.

It is certified that error appears in the above-identified patent and that said Letters Patent is hereby corrected as shown below:

Fig. 4

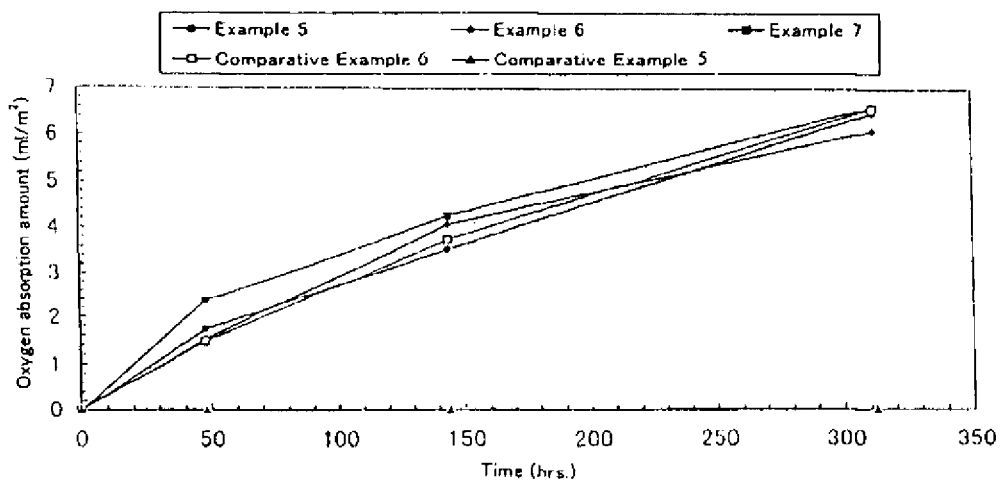

UNITED STATES PATENT AND TRADEMARK OFFICE
CERTIFICATE OF CORRECTION

PATENT NO. : 6,822,031 B2
APPLICATION NO. : 10/111912
DATED : November 23, 2004
INVENTOR(S) : Shinji Tai et al.

It is certified that error appears in the above-identified patent and that said Letters Patent is hereby corrected as shown below:

Fig. 5

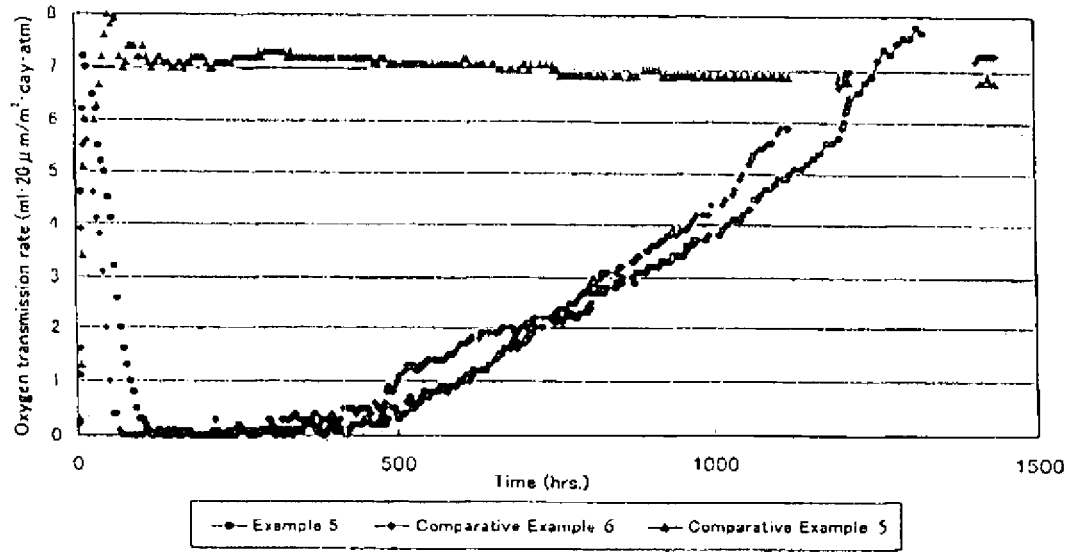

Signed and Sealed this

Thirty-first Day of March, 2009

JOHN DOLL
*Acting Director of the United States Patent and Trademark Office*